(12) United States Patent
Hoskins et al.

(10) Patent No.: US 11,651,231 B2
(45) Date of Patent: May 16, 2023

(54) QUASI-SYSTOLIC PROCESSOR AND QUASI-SYSTOLIC ARRAY

(71) Applicant: Government of the United States of America, as represented by the Secretary of Commerce, Gaithersburg, MD (US)

(72) Inventors: Brian Douglas Hoskins, North Bethesda, MD (US); Mark David Stiles, Silver Spring, MD (US); Matthew William Daniels, Bethesda, MD (US); Advait Madhavan, Silver Spring, MD (US); Gina Cristina Adam, Washington, DC (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 694 days.

(21) Appl. No.: 16/806,121

(22) Filed: Mar. 2, 2020

(65) Prior Publication Data

US 2020/0279169 A1  Sep. 3, 2020

Related U.S. Application Data

(60) Provisional application No. 62/812,953, filed on Mar. 1, 2019.

(51) Int. Cl.
*G06N 3/10* (2006.01)
*G06N 3/063* (2006.01)
*G06N 3/04* (2006.01)
*G06F 17/16* (2006.01)

(52) U.S. Cl.
CPC ............... *G06N 3/10* (2013.01); *G06F 17/16* (2013.01); *G06N 3/04* (2013.01); *G06N 3/0635* (2013.01); *G06F 2207/4824* (2013.01)

(58) Field of Classification Search
CPC .......... G06N 3/04; G06N 3/0635; G06N 3/10; G06F 17/16
See application file for complete search history.

(56) References Cited

U.S. PATENT DOCUMENTS

| | | | |
|---|---|---|---|
| 2018/0005115 A1 | 1/2018 | Gokmen et al. | |
| 2018/0300627 A1 | 10/2018 | Gokmen et al. | |
| 2019/0034788 A1 | 1/2019 | Burr | |
| 2019/0043487 A1* | 2/2019 | Rivkin | G06N 5/003 |

OTHER PUBLICATIONS

Gokmen, et al., "Training LSTM Networks with Resistive Cross-Point Devices", Frontiers in Neuroscience, 2018, p. 1-10, vol. 12.

* cited by examiner

*Primary Examiner* — Michael D. Yaary
(74) *Attorney, Agent, or Firm* — Office of Chief Counsel for National

(57) ABSTRACT

A quasi-systolic array includes: a primary quasi-systolic processor; an edge row bank and edge column bank of edge quasi-systolic processors; and an interior bank of interior quasi-systolic processors. The primary quasi-systolic processor, edge quasi-systolic processor, and interior quasi-systolic processor independently include a quasi-systolic processor and are disposed and electrically connected in rows and columns in the quasi-systolic array.

11 Claims, 19 Drawing Sheets

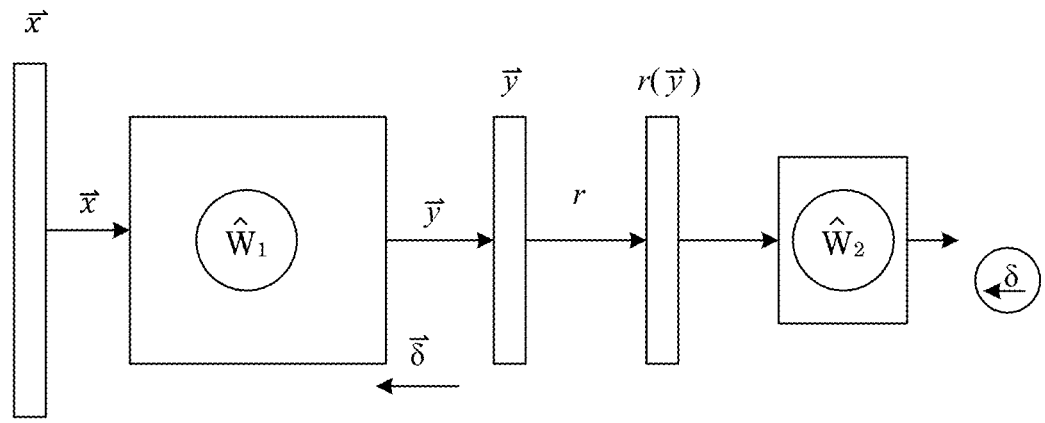

Statistic Gradient Descent (SGD): $\hat{W},^{ij} \leftarrow \hat{W},^{ij} - \eta \left(\delta^i x^j\right) x$  memory, $O(m+n)$ $$\{\vec{x}_i\}, \{\vec{\delta}_i\}_{i=1}^{B}$$

Minibatch SGD: $\hat{W}^{ij} \leftarrow W^{ij} - \eta \left(\sum_p \delta_p^i x_p^j\right)$  memory $O(m \cdot n)$ Quasi-systolic array: top $k$ singular vectors $$\{\Delta_i\}_{i=1}^{k} \{X_i\}_{i=1}^{k \ll B}$$

$$\underbrace{\Sigma \left(\Delta_i X_i\right)}_{O(k \cdot (m+n))} \quad O(m+n)$$

FIG. 11

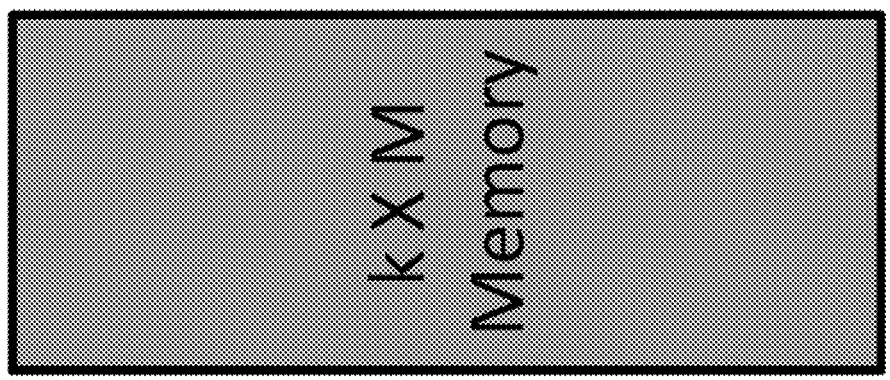
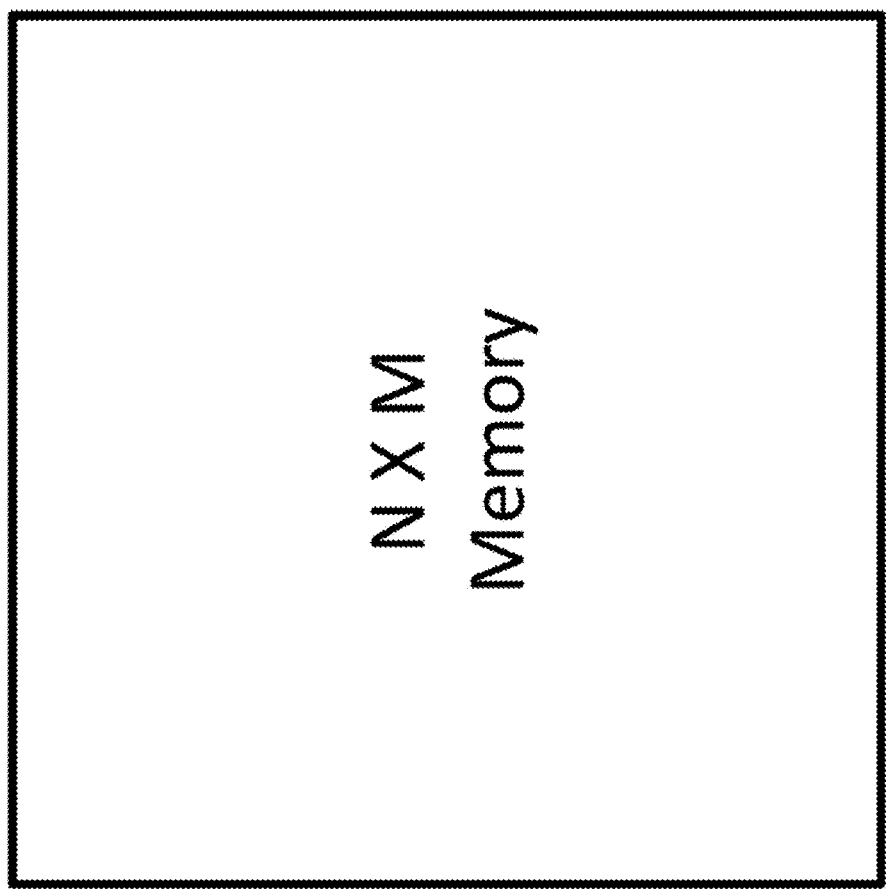
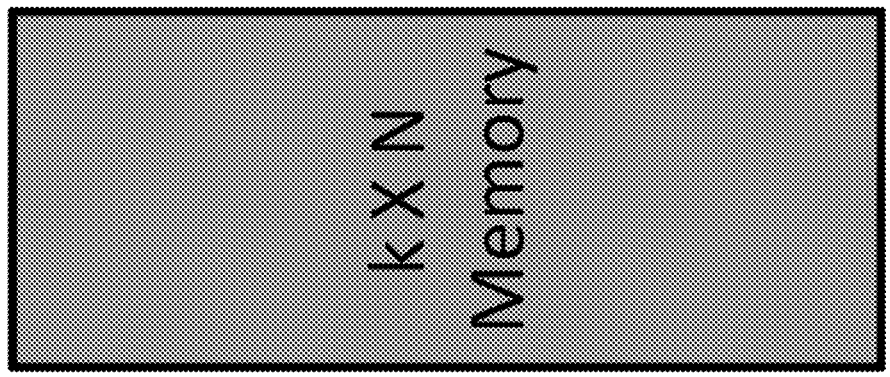
FIG. 13

QUASI-SYSTOLIC PROCESSOR AND QUASI-SYSTOLIC ARRAY

CROSS REFERENCE TO RELATED APPLICATIONS

The application claims priority to U.S. Provisional Patent Application Ser. No. 62/812,953 filed Mar. 1, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce and under Agreement No. 00014-20-1-2031 awarded by the Office of Naval Research and the Defense Advanced Research Program Agency and under a Cooperative Research Agreement Award from NIST to the University of Maryland under Agreement No. 70NANB14H209. The Government has certain rights in the invention. Licensing inquiries may be directed to the Technology Partnerships Office, NIST, Gaithersburg, Md., 99; voice (301)-975-2573; email tpo@nist.gov; reference NIST Docket Number 19-026US1.

BRIEF DESCRIPTION

Disclosed is a quasi-systolic processor comprising: a plurality of forward input transmission lines that individually receive a forward datum, and a number of forward input transmission lines is s; a plurality of forward output transmission lines that individually receive a forward output, and a number of forward output transmission lines is s; a plurality of backward input transmission lines that individually receive a backward datum, and a number of backward input transmission lines is s; a plurality of backward output transmission lines that individually receive a backward output, and a number of backward output transmission lines is s; a plurality of primary processors with a number of primary processors being f, such that:

$$f = \left\lfloor \frac{s}{2} \right\rfloor;$$

each primary processor is connected to: one pair of the forward input transmission lines that comprises: a first forward input transmission line from which the primary processor receives a first forward datum and produces a first forward output from the first forward datum; and a second forward input transmission line from which the primary processor receives a second forward datum and produces a second forward output from the second forward datum; one pair of the forward output transmission lines that comprises: a first forward output transmission line that receives the first forward output from the primary processor; and a second forward output transmission line that receives the second forward output from the primary processor; one pair of the backward input transmission lines that comprises: a first backward input transmission line from which the primary processor receives a first backward datum and produces a first backward output from the first backward datum; and a second backward input transmission line from which the primary processor receives a second backward datum and produces a second backward output from the second backward datum; and one pair of the backward output transmission lines that comprises: a first backward output transmission line that receives the first backward output from the primary processor; and a second backward output transmission line that receives the second backward output from the primary processor; and each primary processor comprises: a forward linear transform processor in electrical, magnetic, mechanical, or photonic communication with the first forward input transmission line, the second forward input transmission line, the first forward output transmission line, the second forward output transmission line, and a phase angle memory and that: receives the first forward datum from the first forward input transmission line, the second forward datum from the second forward input transmission line, and a phase angle from the phase angle memory; and linearly transforms the first forward datum and the second forward datum through a rotation about the phase angle to produce the first forward output and the second forward output that are independent combinations of the first forward datum and the second forward datum; a backward linear transform processor in electrical, magnetic, mechanical, or photonic communication with the first backward input transmission line, the second backward input transmission line, the first backward output transmission line, the second backward output transmission line, and the phase angle memory and that: receives the first backward datum from the first backward input transmission line, the second backward datum from the second backward input transmission line, and the phase angle from the phase angle memory; and linearly transforms the first backward datum and the second backward datum through a rotation about the phase angle to produce the first backward output and the second backward output that are independent combinations of the first backward datum and the second backward datum; the phase angle memory in electrical, magnetic, mechanical, or photonic communication with the forward linear transform processor and the backward linear transform processor and that: stores the phase angle; communicates to the phase angle to the forward linear transform processor and the backward linear transform processor; receives a counter signal from a counter; receives a scaled accumulated phase from a phase angle accumulation memory; and updates the phase angle with the scaled accumulated phase in response to receiving the counter signal from the counter; and the phase angle accumulation memory in electrical, magnetic, mechanical, or photonic communication with the counter and the forward linear transform processor and that: receives the counter signal from the counter, the first forward output from the forward linear transform processor, and an accumulation reset signal from a accumulator controller; and produces the accumulated phase by cumulatively summing the first forward output; and resetting the accumulated phase to the accumulation reset signal in response to receiving the counter signal; and when s is odd, an identity processor that is connected to: one forward input transmission line from which the identity processor receives forward datum and produces an identity output as forward output from the forward datum; and one forward output transmission line that receives the forward output from the identity processor; one backward input transmission line from which the identity processor receives backward datum and produces backward output from the backward datum; and one backward output transmission line that receives the backward output from the identity processor, wherein each forward input transmission line is connected to one of: a single primary processor or a single identity processor of the quasi-systolic processor; each backward input transmission line is connected to one of: a single primary processor or a single identity processor of the quasi-systolic processor; each forward output transmission line is connected to one of: a single primary processor or a single identity processor of the quasi-systolic processor; and each backward output transmission line is connected to one of: a single primary processor or a single identity processor of the quasi-systolic processor.

Disclosed is a quasi-systolic array comprising: a primary quasi-systolic processor; an edge row bank in data communication with the primary quasi-systolic processor and comprising a plurality of edge quasi-systolic processors; an edge column bank in data communication with the primary quasi-systolic processor and comprising a plurality of edge quasi-systolic processors; an interior bank in data communication with the edge row bank and the edge column bank and comprising a plurality of interior quasi-systolic processors, such that each primary quasi-systolic processor, edge quasi-systolic processor, and interior quasi-systolic processor independently comprise a quasi-systolic processor of claim 1, and each quasi-systolic processor is in electrical, magnetic, mechanical, or photonic communication with another quasi-systolic processor, and the quasi-systolic processors are disposed and electrically connected in rows and columns of quasi-systolic processors, such that: the primary quasi-systolic processor and the edge row bank are disposed in a first row of the quasi-systolic array; the primary quasi-systolic processor and the edge column bank are disposed in a first column of the quasi-systolic array; the primary quasi-systolic processor initially receives forward datum before any other quasi-systolic processor in the quasi-systolic array and initially produces forward output from the initially received forward datum before any other quasi-systolic processor in the quasi-systolic array; at least half of the forward output transmission lines of the primary quasi-systolic processor is connected to a single edge quasi-systolic processor of the edge row bank, and at least half of the forward output transmission lines of the primary quasi-systolic processor is connected to a single edge quasi-systolic processor of the edge column bank; in the edge row bank, edge quasi-systolic processors are electrically connected to each other in seriatum, and a number of forward input transmission lines halves sequentially from quasi-systolic processor to quasi-systolic processor; in the edge column bank, edge quasi-systolic processors are electrically connected to each other in seriatum, and a number of forward input transmission lines halves sequentially from quasi-systolic processor to quasi-systolic processor; and in the interior bank, an interior quasi-systolic processor receives forward datum and produces backward datum that is subjected to backward propagation through interior quasi-systolic processors in the interior bank and edge quasi-systolic processors in the edge row bank and the edge column bank and finally received by the primary quasi-systolic processor.

Disclosed is a process for performing streaming eigen-updates in a hardware neuromorphic network that comprises the quasi-systolic array of claim 6, the process comprising: receiving, by the primary quasi-systolic processor of the quasi-systolic array, a first forward datum and a second forward datum; producing, by the primary quasi-systolic processor from the first forward datum and the second forward datum, a first forward output and a second forward output; receiving the first forward output from the primary quasi-systolic processor by the edge row bank, and serially iteratively transforming and reducing a dimensionality of the first forward output by the edge quasi-systolic processors of the edge row bank to produce third forward data for the interior quasi-systolic processors in the interior bank; receiving the second forward output from the primary quasi-systolic processor by the edge column bank, and serially iteratively transforming and reducing a dimensionality of the second forward output by the edge quasi-systolic processors of the edge column bank to produce fourth forward data for the interior quasi-systolic processors in the interior bank; receiving the third forward data and the fourth forward data by the interior quasi-systolic processors in the interior bank and producing first backward data and second backward date from the third forward data and the fourth forward data and backward propagating the first backward data and the second backward data through the interior quasi-systolic processors in the interior bank by serially iteratively transforming the first backward data and the fourth backward data by the interior quasi-systolic processors to produce third backward data and fourth backward data; receiving the third backward data from the interior bank by the edge row bank, and serially iteratively transforming the third backward data by the edge quasi-systolic processors of the edge row bank to produce fifth backward data for the primary quasi-systolic processor; receiving the fourth backward data from the interior bank by the edge column bank, and serially iteratively transforming the fourth backward data by the edge quasi-systolic processors of the edge column bank to produce sixth backward data for the primary quasi-systolic processor; receiving the fifth backward data from the edge row bank and the sixth backward data from the edge column bank by the primary quasi-systolic processor, and transforming the fifth backward data and the sixth backward data by the primary quasi-systolic processor to produce final backward data to perform streaming eigen-updates in the hardware neuromorphic network.

BRIEF DESCRIPTION OF THE DRAWINGS

The following description cannot be considered limiting in any way. With reference to the accompanying drawings, like elements are numbered alike.

FIG. 11 shows a plurality of transformations;

FIG. 13 shows a machine learning machine that includes an N×M memory array, a k×N memory array, and a k×M memory array. The short-term memory array stores updates of N×M array that are periodically transferred. The short-term memory arrays can equivalently be in combination with the N×M array to store and use a prediction of the future state of the N×M array;

and (B) and (D) singular values for $$\varepsilon = 1 - \text{abs}\left(\frac{\sigma^{i2}}{\sigma^{i,j2}}\right).$$

Figure 18:
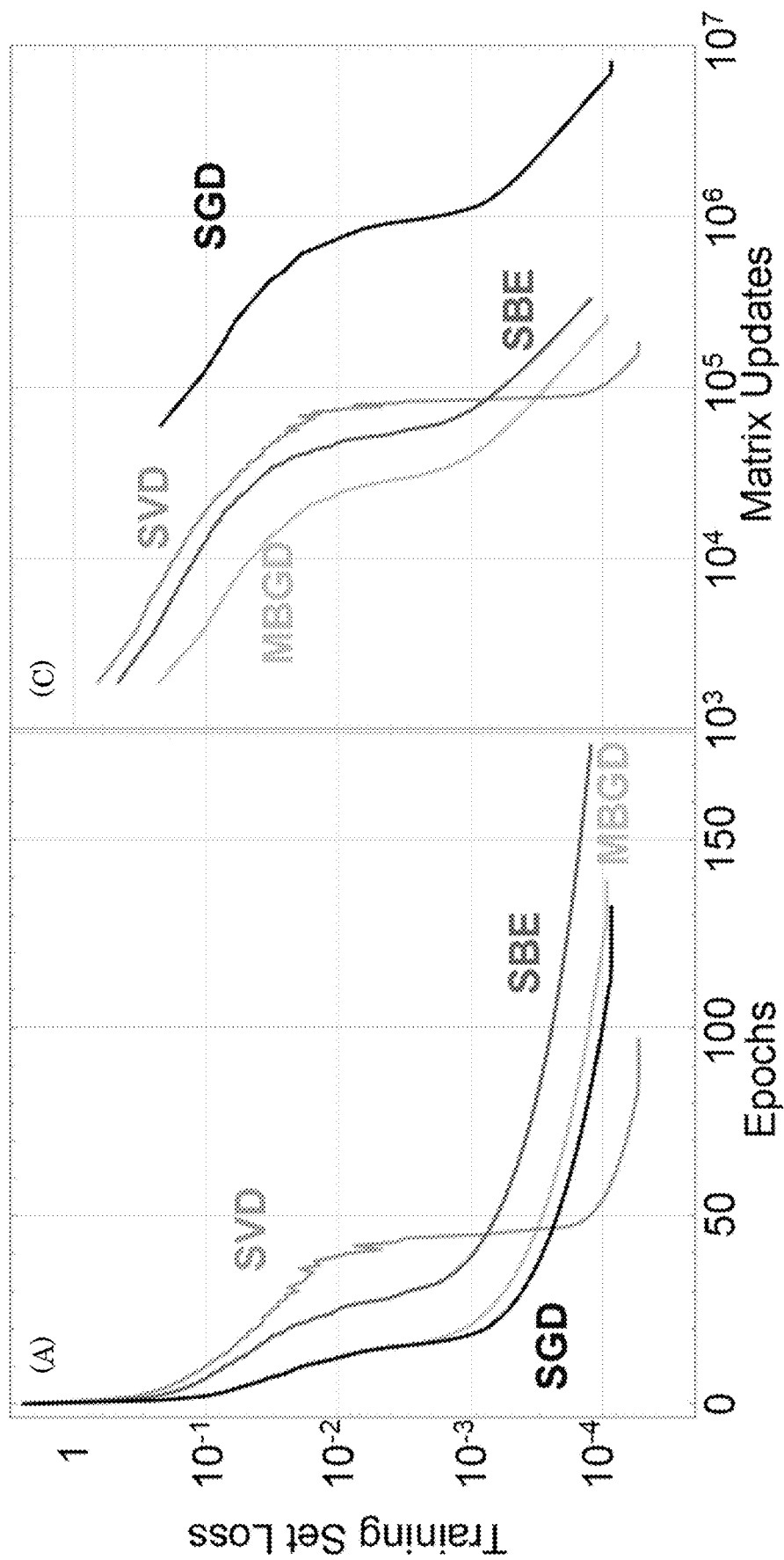
Figure 19:
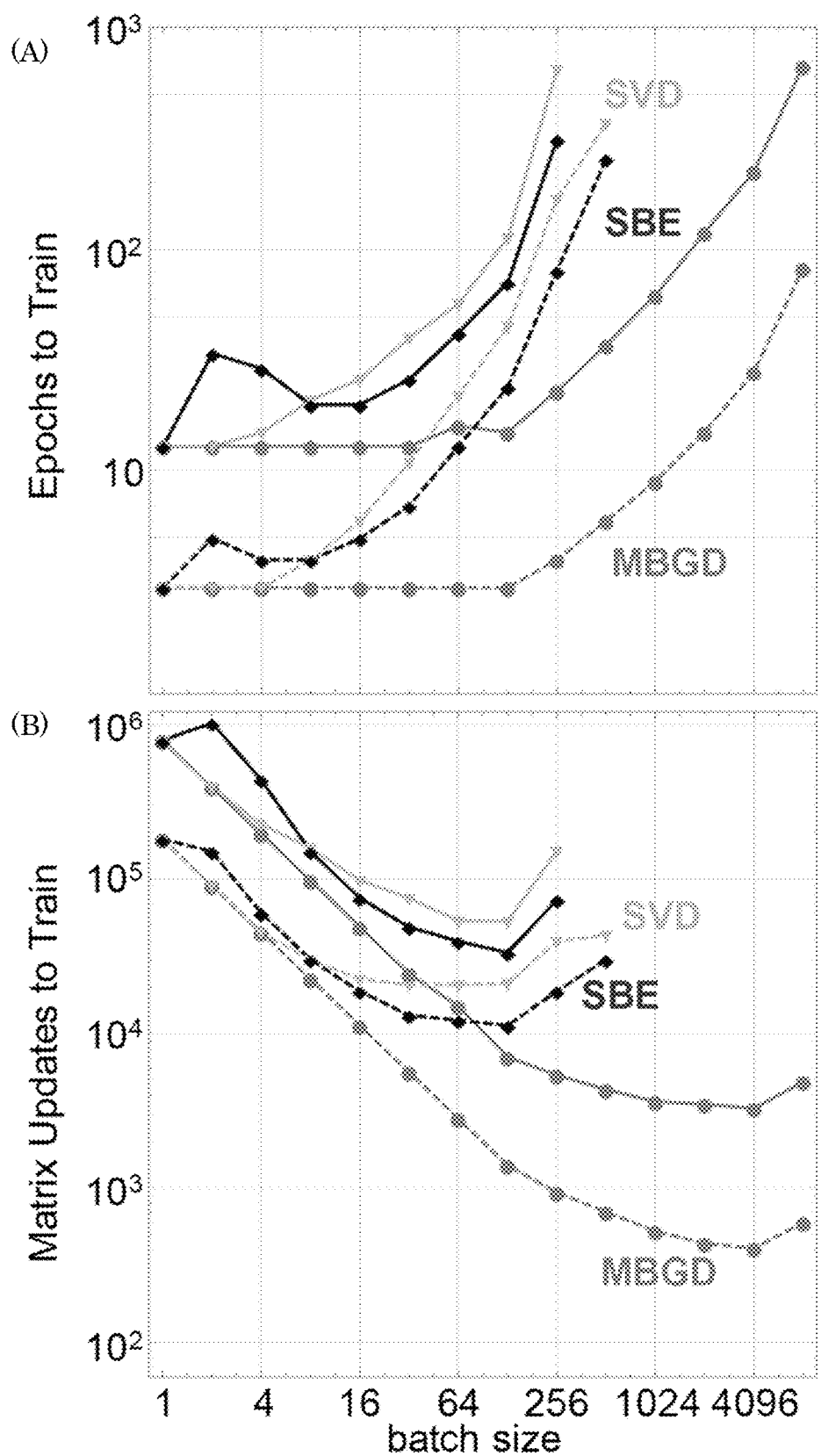

Batch sizes were 32 for panel A and B and 1024 for panel C and D. The larger batches had greater fidelity with more iterations. Increases in the difference corresponded to the update of the weight matrix and subsequent change in the gradient;

FIG. 18 shows training set loss functions under different SGD and batch learning rules (for a batch size of 32) versus a number of epochs in panel A and matrix updates in panel B. SVD and SBE included more epochs to train and fewer matrix updates than MBGD and SGD; and FIG. 19 shows an graphs for different training rules versus batch size including in panel A the number of epochs to train the training set loss function down to 0.1 (dashed lines) and 0.01 (solid lines) and in panel B the number of matrix updates to set the loss function to 0.1 (dashed lines) and to 0.01 (solid lines). SVD and SBE training rules increased update efficiency compared to MBGD and SGD.

DETAILED DESCRIPTION

A detailed description of one or more embodiments is presented herein by way of exemplification and not limitation.

It has been discovered that for hardware accelerated machine learning systems a quasi-systolic array that includes a plurality of quasi-systolic processors calculate a low rank matrix decomposition to approximate a full rank update matrix without explicitly calculating a full rank update matrix. Advantageously, the quasi-systolic array trains a hardware neuromorphic network at a greater efficiency in terms of area, time, and energy than conventional systolic processors. Moreover, quasi-systolic array provides a computer architecture that efficiently calculates a weight matrix update for the hardware neuromorphic network. Neuromorphic networks can include billions of unique, tunable parameters. For each parameter under operation, hardware calculates how each parameter should be tuned. Beneficially, the quasi-systolic array performs operations of an approximation algorithm for this calculation with less memory overhead. Parameters in the hardware neuromorphic network can be stored in a physical crossbar array that has a matrix representation, referred to as a main parameter array. Conventional architectures update the matrix by calculating an additional update matrix to transfer into the main parameter array. A dimension of the update matrix is as large as that of the main parameter array. In contract, the quasi-systolic array provides matrix decomposition methods, such as streaming principal component analysis, to calculate an approximation of the update matrix using far fewer parameters stored in memory. As a result of the fewer number of memory locations used and calculations to train the network performed by the quasi-systolic array, the quasi-systolic array reduces time, area, and energy needed to operate the neuromorphic hardware system as compared with conventional arrays of systolic processors.

In an embodiment, with reference to FIG. 1, FIG. 2, FIG. 3, FIG. 4, and FIG. 5, quasi-systolic processor 201 includes a plurality of forward input transmission lines 209 that individually receive forward datum 208, and a number of forward input transmission lines 209 is s; a plurality of forward output transmission lines 216 that individually receive a forward output 212, and a number of forward output transmission lines 216 is s; a plurality of backward input transmission lines 210 that individually receive a backward datum 211, and a number of backward input transmission lines 210 is s; a plurality of backward output transmission lines 217 that individually receive a backward output 213, and a number of backward output transmission lines 217 is s; a plurality of primary processor 202 with a number of primary processor 202 being f, such that $$f = \left\lfloor \frac{s}{2} \right\rfloor.$$

Each primary processor 202 is connected to: one pair of forward input transmission lines 209 that includes first forward input transmission line 209.1 from which primary processor 202 receives first forward datum 208.1 and produces first forward output 212.1 from first forward datum 208.1, and second forward input transmission line 209.2 from which primary processor 202 receives second forward datum 208.2 and produces second forward output 212.2 from second forward datum 208.2; one pair of forward output transmission lines 216 that includes first forward output transmission line 216.1 that receives first forward output 212.1 from primary processor 202, and second forward output transmission line 216.2 that receives second forward output 212.2 from primary processor 202; one pair of backward input transmission lines 210 that includes first backward input transmission line 210.1 from which primary processor 202 receives first backward datum 211.1 and produces first backward output 213.1 from first backward datum 211.1, and second backward input transmission line 210.2 from which primary processor 202 receives second backward datum 211.2 and produces second backward output 213.2 from second backward datum 211.2; and one pair of backward output transmission lines 217 that include first backward output transmission line 217.1 that receives first backward output 213.1 from primary processor 202, and second backward output transmission line 217.2 that receives second backward output 213.2 from primary processor 202.

Each primary processor 202 includes forward linear transform processor 218 in electrical, magnetic, mechanical, or photonic communication with first forward input transmission line 209.1, second forward input transmission line 209.2, first forward output transmission line 216.1, second forward output transmission line 216.2, and phase angle memory 220. Forward linear transform processor 218 receives first forward datum 208.1 from first forward input transmission line 209.1, second forward datum 208.2 from second forward input transmission line 209.2, and phase angle 226 from phase angle memory 220; and linearly transforms first forward datum 208.1 and second forward datum 208.2 through a rotation about phase angle 226 to produce first forward output 212.1 and second forward output 212.2 that are independent combinations of first forward datum 208.1 and second forward datum 208.2. Each primary processor 202 also includes backward linear transform processor 219 in electrical, magnetic, mechanical, or photonic communication with first backward input transmission line 210.1, second backward input transmission line 210.2, first backward output transmission line 217.1, second backward output transmission line 217.2, and phase angle memory 220. Backward linear transform processor 219 receives first backward datum 211.1 from first backward input transmission line 210.1, second backward datum 211.2 from second backward input transmission line 210.2, and phase angle 226 from phase angle memory 220; and linearly transforms first backward datum 211.1 and second backward datum 211.2 through a rotation about phase angle 226 to produce first backward output 213.1 and second backward output 213.2 that are independent combinations of first backward datum 211.1 and second backward datum 211.2. Each primary processor 202 also includes phase angle memory 220 and phase angle accumulation memory 221.

Phase angle memory 220 is in electrical, magnetic, mechanical, or photonic communication with forward linear transform processor 218 and backward linear transform processor 219 and stores phase angle 226; communicates phase angle 226 to forward linear transform processor 218 and backward linear transform processor 219; receives counter signal 227 from counter 222; receives scaled accumulated phase 229 from phase angle accumulation memory 221; and updates phase angle 226 with scaled accumulated phase 229 in response to receiving counter signal 227 from counter 222.

Phase angle accumulation memory 221 is in electrical, magnetic, mechanical, or photonic communication with counter 222 and forward linear transform processor 218 and receives counter signal 227 from counter 222, first forward output 212.1 from forward linear transform processor 218, and an accumulation reset signal 230 from accumulator controller 224; and produces accumulated phase 228 by cumulatively summing first forward output 212.1; and resetting accumulated phase 228 to accumulation reset signal 230 in response to receiving counter signal 227.

When s is odd, quasi-systolic processor 201 includes identity processor 214 that is connected to: one forward input transmission line 209 from which identity processor 214 receives forward datum 208 and produces identity output 215 as forward output 212 from forward datum 208; one forward output transmission line 216 that receives the forward output 212 from identity processor 214; one backward input transmission line 210 from which identity processor 214 receives backward datum 211 and produces backward output 213 from backward datum 211; and one backward output transmission line 217 that receives backward output 213 from identity processor 214.

In quasi-systolic processor 201, each forward input transmission line 209 is connected to one of: a single primary processor 202 or a single identity processor 214 of quasi-systolic processor 201; each backward input transmission line 210 is connected to one of: a single primary processor 202 or a single identity processor 214 of quasi-systolic processor 201; each forward output transmission line 216 is connected to one of: a single primary processor 202 or a single identity processor 214 of quasi-systolic processor 201; and each backward output transmission line 217 is connected to one of: a single primary processor 202 or a single identity processor 214 of quasi-systolic processor 201.

Figure 1:
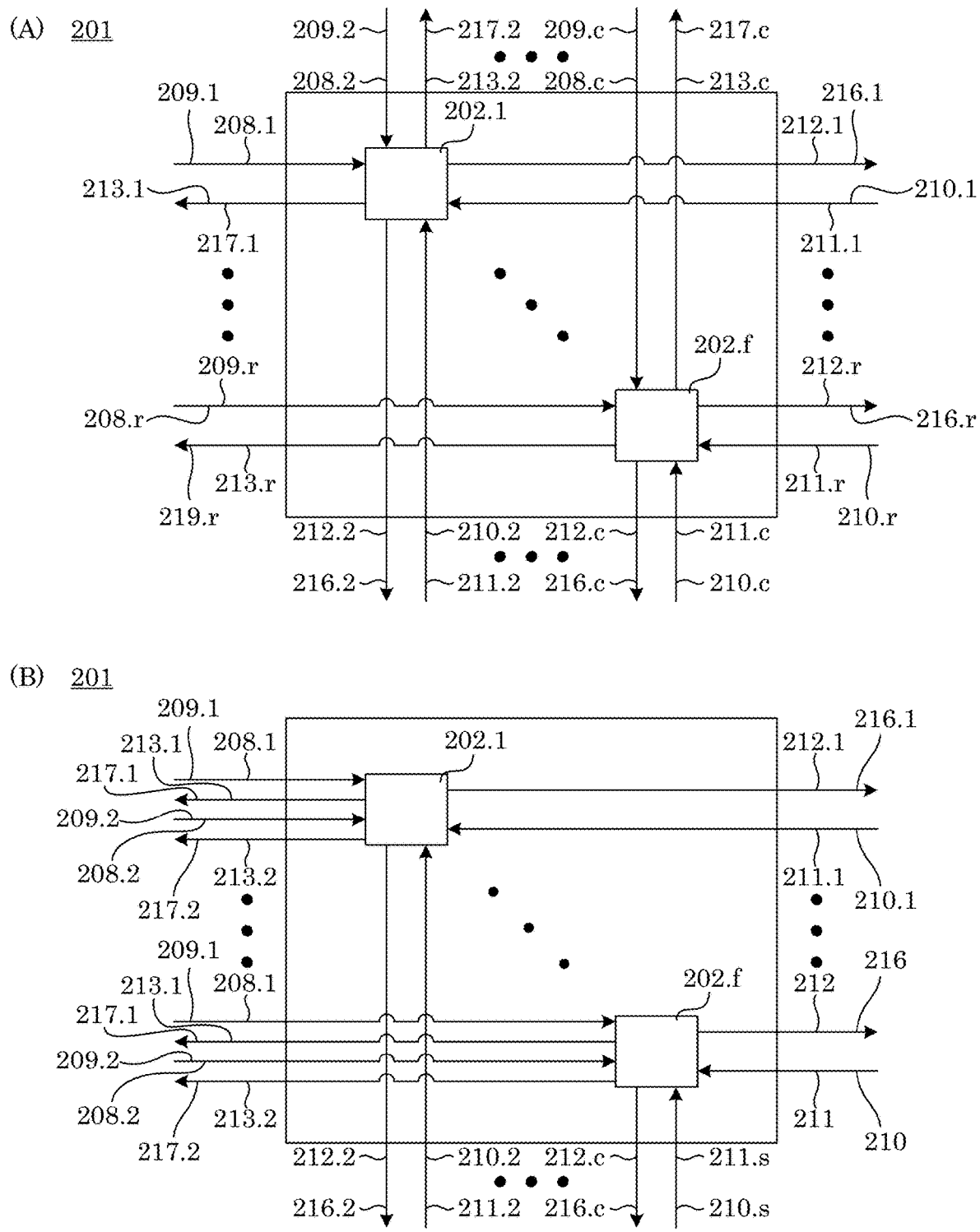
FIG. 1 shows a quasi-systolic processor in panels A and B.
Figure 2:
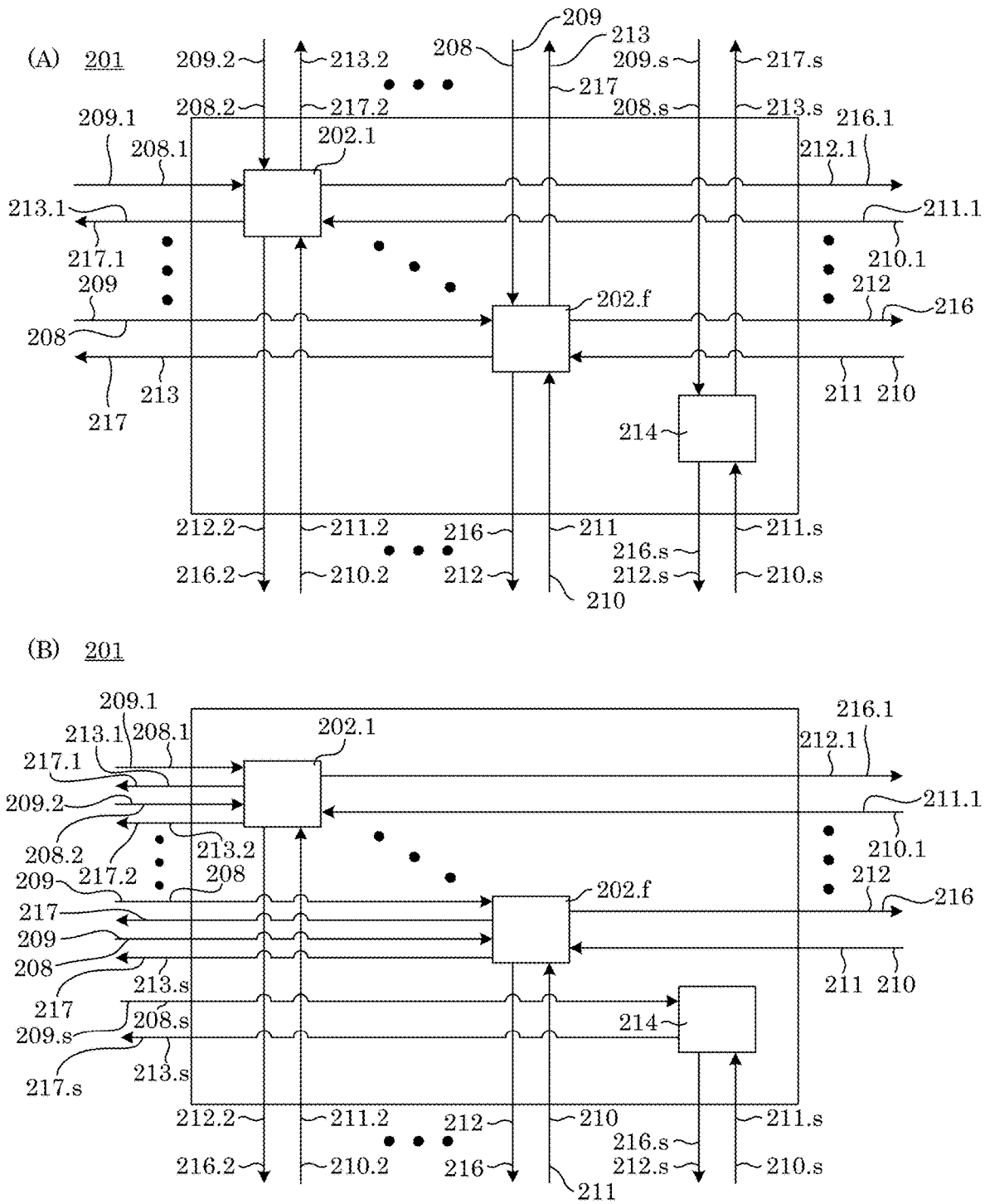
FIG. 2 shows a quasi-systolic processor in panels A and B.
Figure 3:
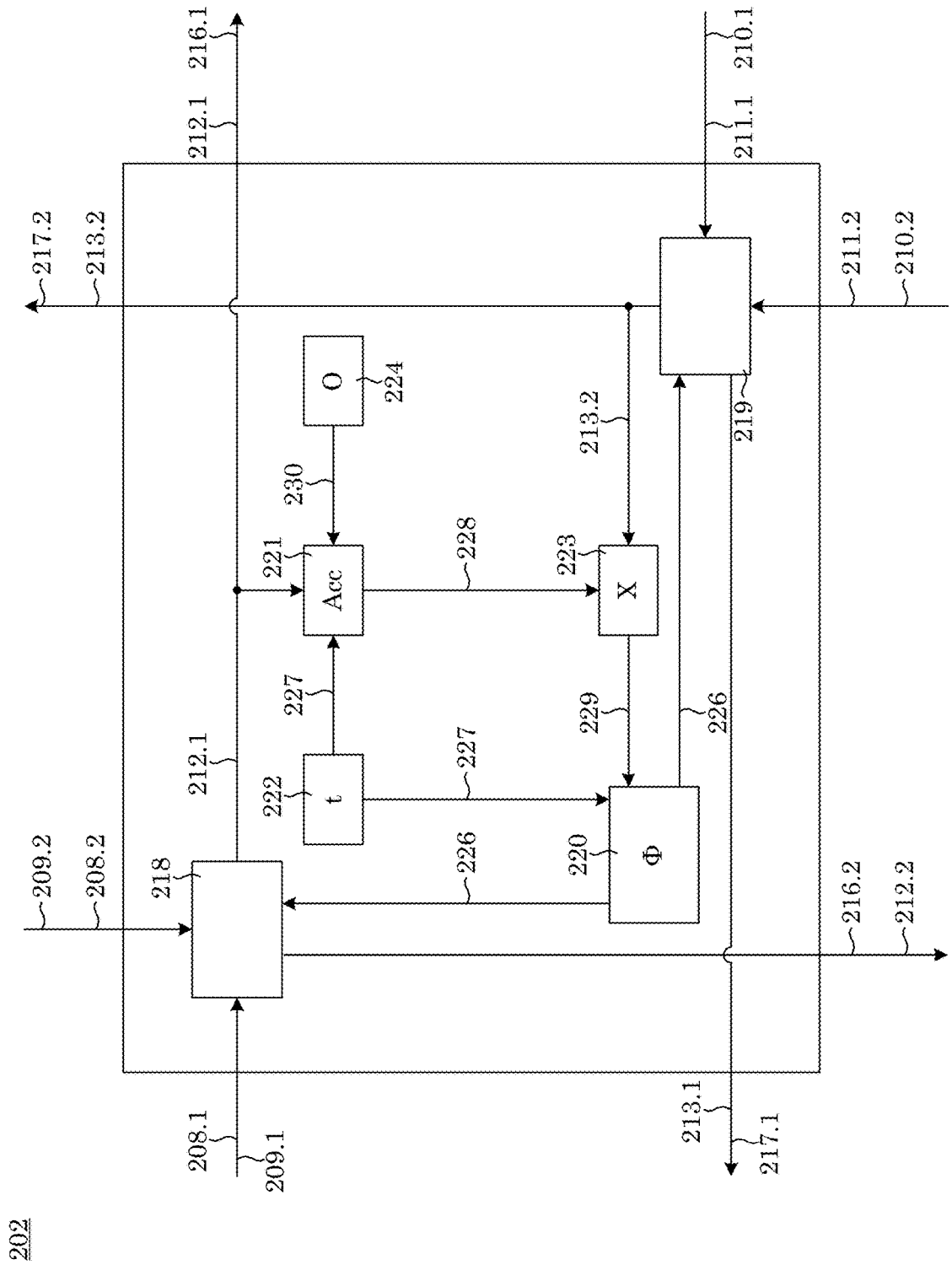
FIG. 3 shows a primary processor.

In an embodiment, with reference to FIG. 3, primary processor 202 also include accumulator controller 224 in electrical, magnetic, mechanical, or photonic communication with phase angle accumulation memory 221; and counter 222 in electrical, magnetic, mechanical, or photonic communication with phase angle accumulation memory 221, phase angle memory 220, and backward linear transform processor 219. Counter 222 receives accumulated phase 228 from phase angle accumulation memory 221; receives second backward output 213.2 from backward linear transform processor 219; and produces scaled accumulated phase 229 by applying second backward output 213.2 to accumulated phase 228.

Figure 4:
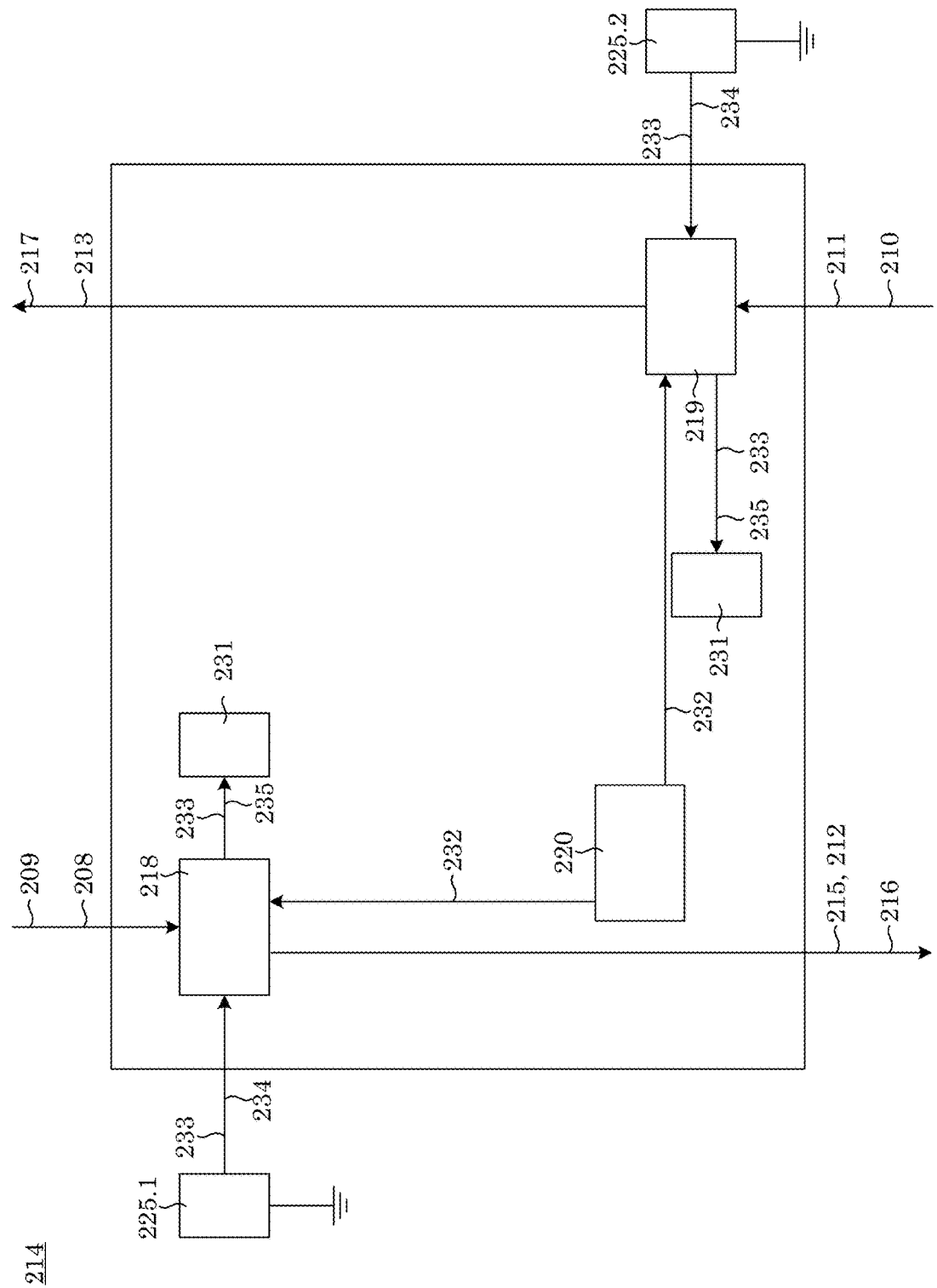
FIG. 4 shows an identity processor.

According to an embodiment, with reference to FIG. 4, quasi-systolic processor 201 identity processor 214 includes: first dummy input member 225.1 in electrical, magnetic, mechanical, or photonic communication with second forward linear transform processor 218 and that communicates first dummy input data 234 to second forward linear transform processor 218; and second forward linear transform processor 218 in electrical, magnetic, mechanical, or photonic communication with forward input transmission line 209, second phase angle memory 220, forward output transmission line 216, and first dummy output member 231. Second forward linear transform processor 218 receives forward datum 208 from forward input transmission line 209, first dummy input data 234 from first dummy input member 225.2, and zero phase angle 232 from second phase angle memory 220; and linearly transforms forward datum 208 and first dummy input data 234 through rotation about zero phase angle 232 to produce identity output 215 as forward output 212 and first dummy output data 235, such that forward output 212 is identical to forward datum 208.

In an embodiment, identity processor 214 also includes: second dummy input member 225.2 in electrical, magnetic, mechanical, or photonic communication with second backward linear transform processor 219 and that communicates second dummy input data 234 to second forward linear transform processor 218; and second backward linear transform processor 219 in electrical, magnetic, mechanical, or photonic communication with backward input transmission line 210, second phase angle memory 220, backward output transmission line 217, and second dummy output member 231 and that: receives backward datum 211 from backward input transmission line 210, second dummy input data 234 from second dummy input member 225.2, and zero phase angle 232 from second phase angle memory 220; and linearly transforms backward datum 211 and second dummy input data 234 through rotation about zero phase angle 232 to produce backward output 213 and second dummy output data 235, such that backward output 213 is identical to backward datum 211.

Figure 8:
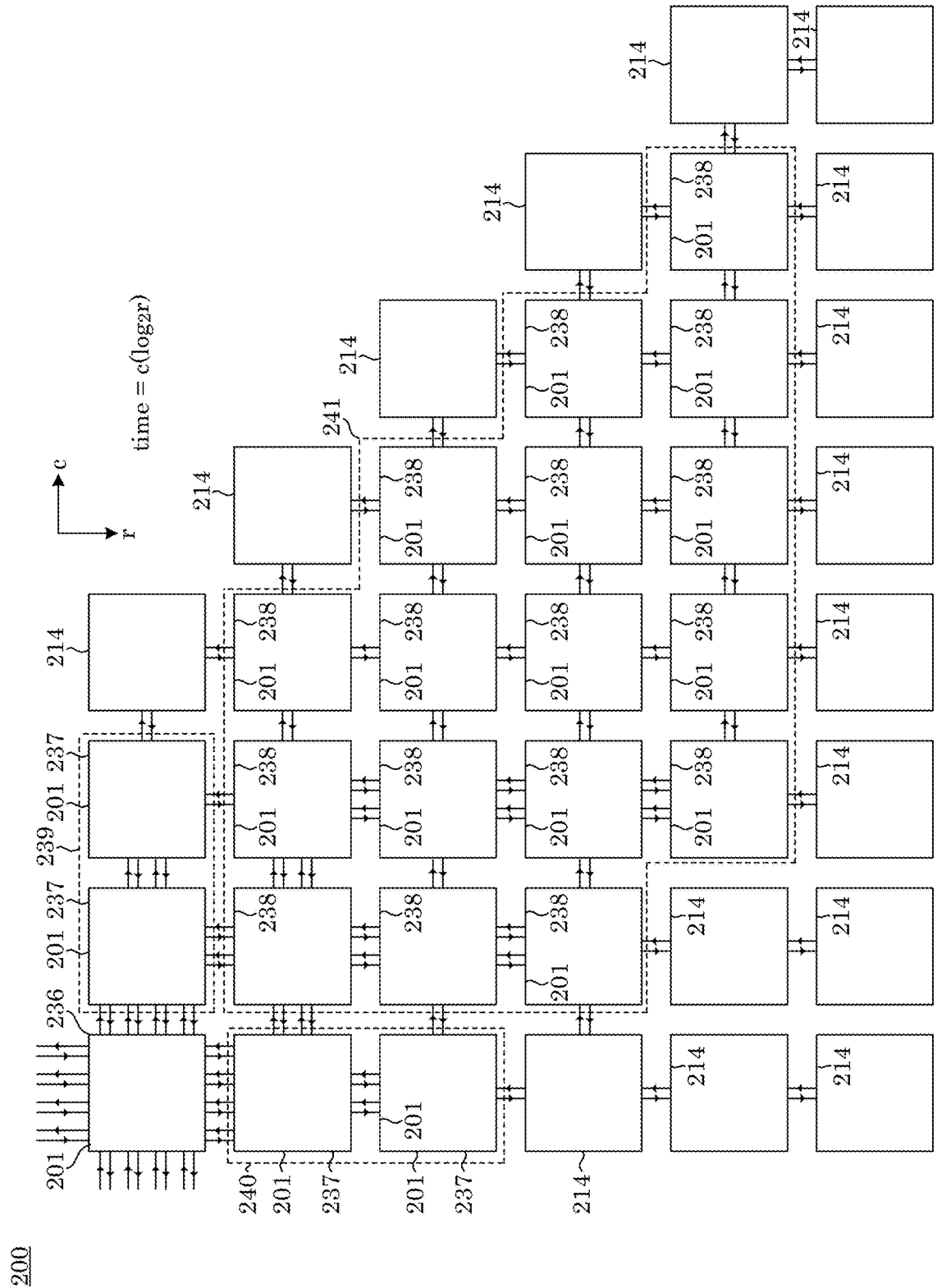
FIG. 8 shows a quasi-systolic array that includes eight forward input transmission lines of a primary quasi-systolic processor and corresponding numbers of edge quasi-systolic processors and interior quasi-systolic processors.
Figure 9:
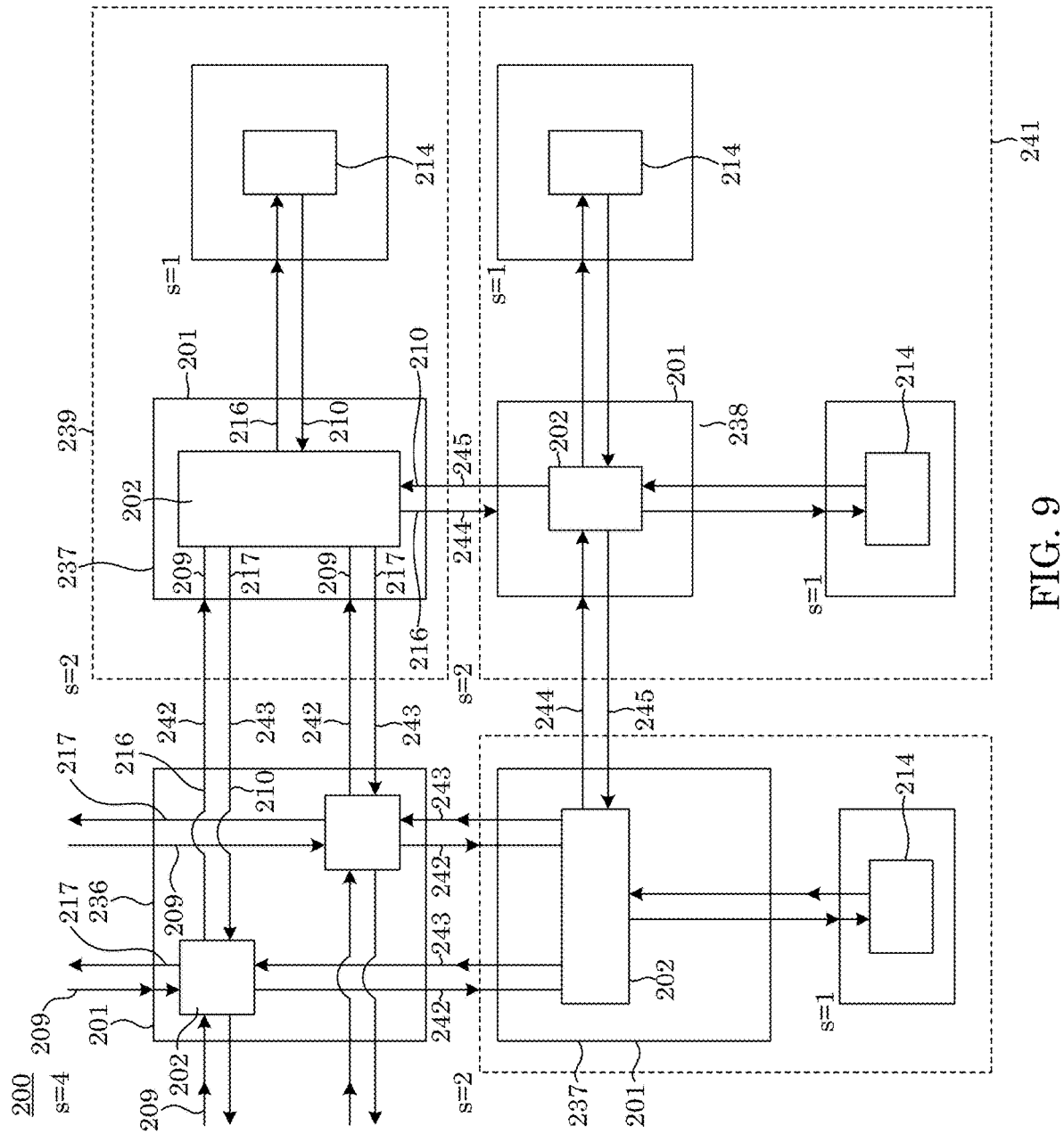
FIG. 9 shows a quasi-systolic array that includes four forward input transmission lines of a primary quasi-systolic processor and corresponding numbers of edge quasi-systolic processors and interior quasi-systolic processors.

A plurality of quasi-systolic processors 201 can be interconnected in quasi-systolic array 200. In an embodiment, with reference to FIG. 5 for two quasi-systolic processors 201 of a quasi-systolic array 200, FIG. 6 for a generalized quasi-systolic array 200, FIG. 7 for quasi-systolic array 200 with an arbitrary number of first data received by primary quasi-systolic processor 236, FIG. 8 for eight first data received by primary quasi-systolic processor 236, and FIG. 9 for four first data received by primary quasi-systolic processor 236, quasi-systolic array 200 includes: primary quasi-systolic processor 236; edge row bank 239 in data communication (e.g., edge forward data flow 242 and edge backward data flow 243) with primary quasi-systolic processor 236 and including a plurality of edge quasi-systolic processors 237; edge column bank 240 in data communication (e.g., edge forward data flow 242 and edge backward data flow 243) with primary quasi-systolic processor 236 and including a plurality of edge quasi-systolic processors 237; interior bank 241 in data communication (e.g., interior backward data flow 245 and interior backward data flow 245) with edge row bank 239 and edge column bank 240 and including a plurality of interior quasi-systolic processors 238, wherein each primary quasi-systolic processor 236, edge quasi-systolic processor 237, and interior quasi-systolic processor 238 independently are a quasi-systolic processor 201; each quasi-systolic processor 201 is in electrical, magnetic, mechanical, or photonic communication with another quasi-systolic processor 2011. Quasi-systolic processors 201 are disposed and electrically connected in rows and columns. Primary quasi-systolic processor 236 and edge row bank 239 are disposed in a first row of quasi-systolic array 200; primary quasi-systolic processor 236 and edge column bank 240 are disposed in a first column of quasi-systolic array 200. Here, primary quasi-systolic processor 236 initially receives forward datum 208 before any other quasi-systolic processor 201 in quasi-systolic array 200 and initially produces forward output 212 from the initially received forward datum 208 before any other quasi-systolic processor 201 in primary quasi-systolic processor 236. At least half of the forward output transmission lines of the primary quasi-systolic processor 236 is connected to a single edge quasi-systolic processor 237 of the edge row bank 239, and at least half of forward output transmission lines 216 of primary quasi-systolic processor 236 is connected to a single edge quasi-systolic processor 237 of edge column bank 240. In edge row bank 239, edge quasi-systolic processors 237 are electrically connected to each other in seriatum, and a number of forward input transmission lines 209 halves sequentially from quasi-systolic processor 201 to quasi-systolic processor 201. In edge column bank 240, edge quasi-systolic processors 237 are electrically connected to each other in seriatum, and a number of forward input transmission lines 209 halves sequentially from quasi-systolic processor 201 to quasi-systolic processor 201. In interior bank 241, interior quasi-systolic processor 238 receives forward datum 208 and produces backward datum 211 that is subjected to backward propagation through interior quasi-systolic processors in interior bank 241 and edge quasi-systolic processors 237 in edge row bank 239 and edge column bank 240 and finally received by primary quasi-systolic processor 236.

A plurality of quasi-systolic arrays 200 can be interconnected in neuromorphic network 203. In an embodiment, with reference to FIG. 10, neuromorphic network 203 includes a plurality of quasi-systolic arrays 200 in data communication with forward data member 206 to receive forward datum 208 from forward data member 206 and in data communication with backward data member 248 to receive backward datum 211 from quasi-systolic arrays 200. Controller 204 is in communication with forward data member 206 and backward data member 248 for control of with forward data member 206 and backward data member 248.

Several data are communicated in quasi-systolic processor 201, primary processor 202, and identity processor 214 and include forward datum 208, backward datum 211, forward output 212, backward output 213, identity output 215, dummy input data 234, and dummy output data 235. It is contemplated that forward datum 208, backward datum 211, forward output 212, backward output 213, identity output 215, dummy input data 234, and dummy output data 235 independently can include multiple bit digital voltages, analog voltage signals, multiple bit photonic signals, analog photonic signals (encoded in either intensity or polarization), or spin waves to generate information about the gradient of the neural network training and can be raw image, sound, text, video, medical information at the input layer or processed information of this nature from deeper layers into the neural network as well as back-propagated error information from the final layer or processed back-propagated error information from the final layer. Exemplary data include an image of a cat, a video of a child, the text of a novel, as well as information about whether the network correctly analyzes the image of the cat, the video of the child, or the text of the novel. Moreover, in addition to the data from the network layer, these data can also be the modified data from the quasi-systolic processor. Data can take the form of temporal pulses of from 100 picoseconds to 1 second, specifically from 10 nanoseconds to 1 microsecond, and more specifically from 10 to 50 nanoseconds. These patterns can include 1 bit to 256 bits or more specifically from 1 bit to 4 bits. The voltage composing the signals can be from −10 Volts to 10 Volts or more specifically from 0 Volts to 3.3 Volts. In photonic embodiments these signals can be composed from 1 to $10^{12}$ photons or more specifically from 1 to 1000 photons. In an embodiment, data includes an 8 digital bit string with 0 Volts being logical low and 3.3 Volts being logical high derived from the pixel information from a digital image as could be taken with a digital camera. In an embodiment, forward datum 208 is an 8 digital bit string with 0 Volts being logical low and 3.3 Volts being logical high from a digital image. In an embodiment, backward datum 211 is an 8 big digital bit string with 0 Volts being logical low and 3.3 volts being logical high containing information about the classification error. In an embodiment, forward output 212 is an 8 bit digital string of linearly transformed information from a forward datum 208 In an embodiment, backward output 213 is an 8 bit digital string with a linearly transformed information from datum 211 In an embodiment, identity output 215 outputs an 8 bit digital string (dummy output data 235) which equal to its inputted forward datum 208. In an embodiment, dummy input data 234 is an 8 big digital string representing the number zero. In an embodiment, dummy output data 235 is an 8 bit digital string which is equal to its inputted forward datum 208.

Figure 5:
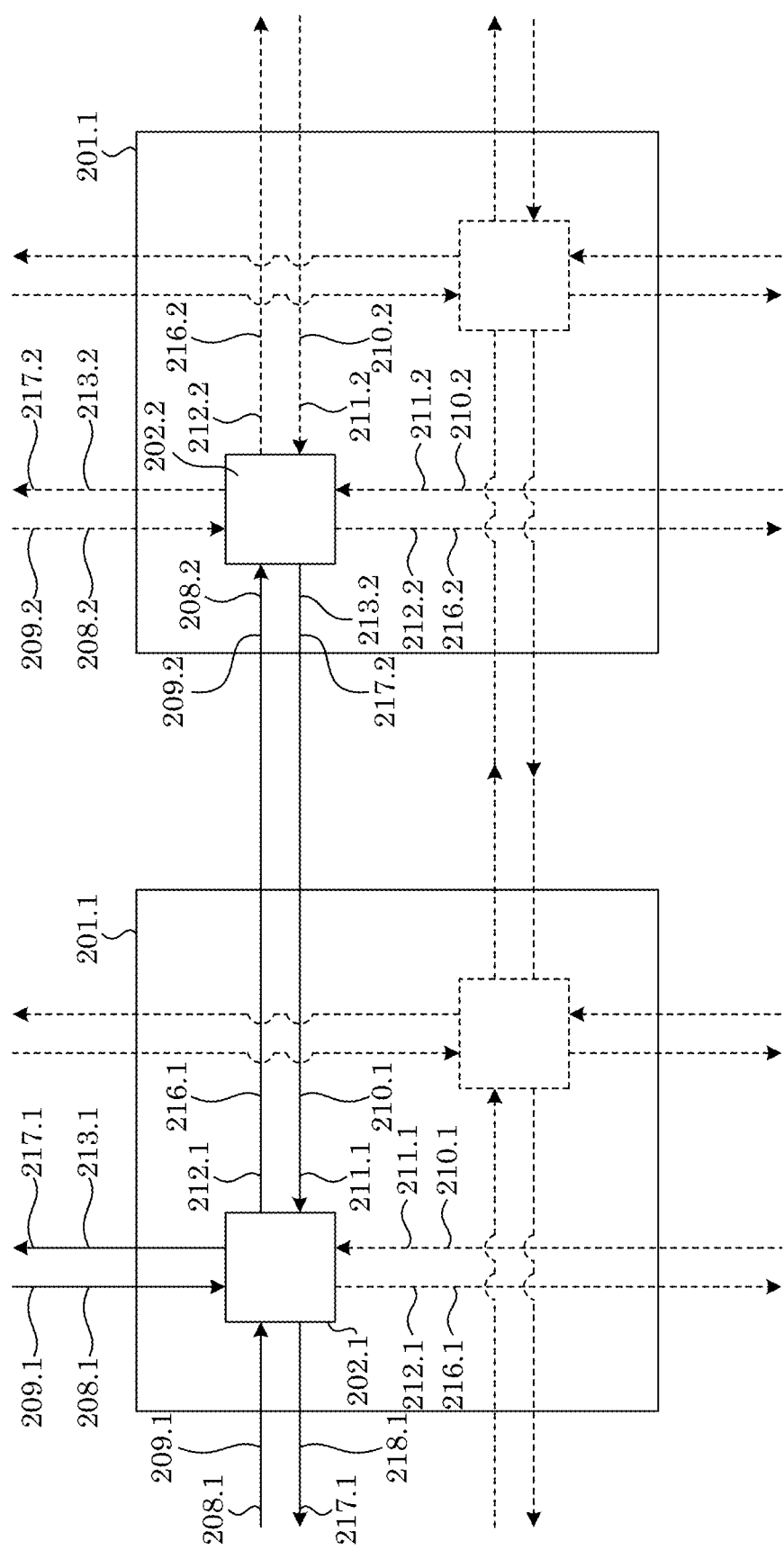
FIG. 5 shows an intercommunication along transmission lines between a first quasi-systolic processor and a second quasi-systolic processor.
Figure 6:
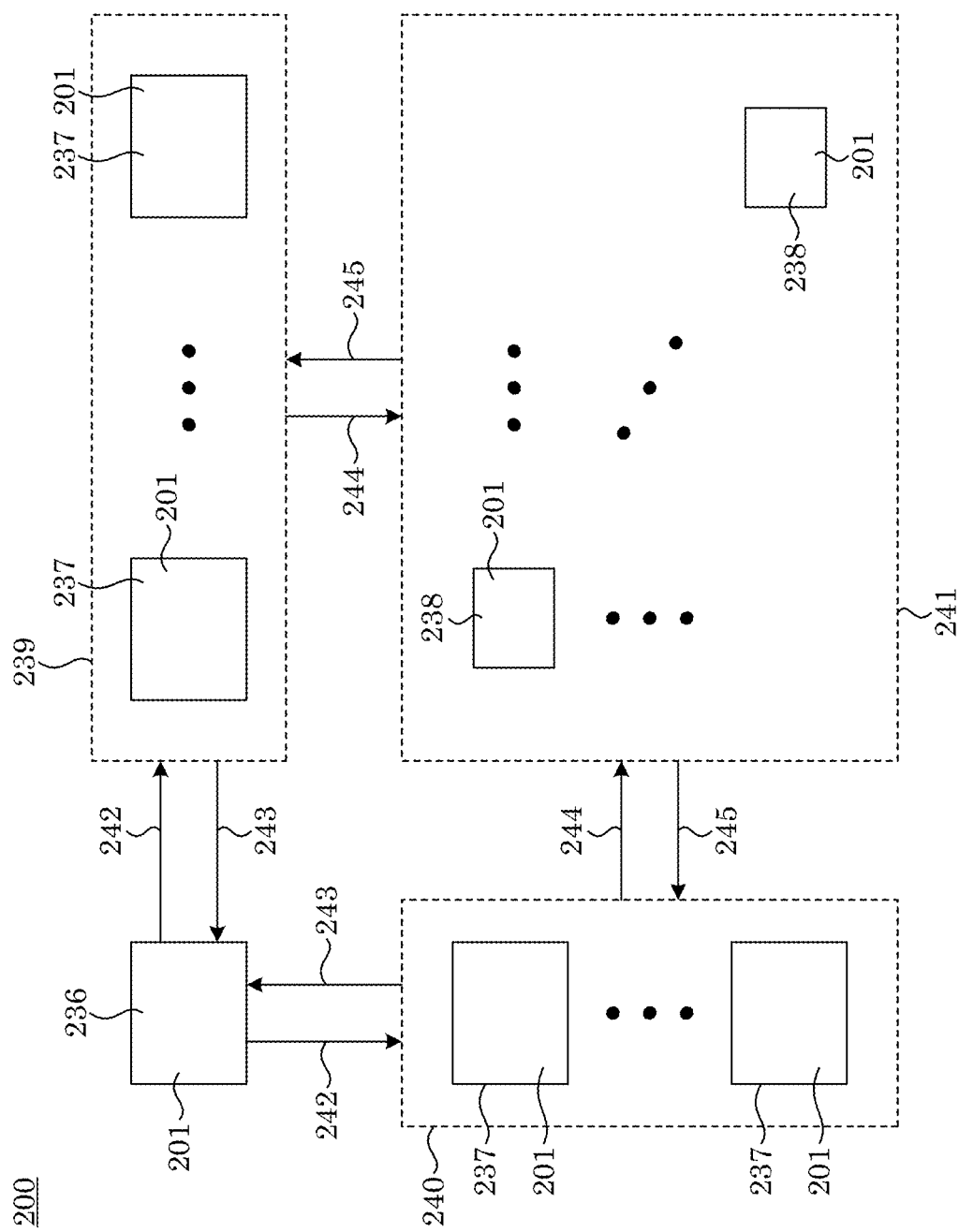
FIG. 6 shows a quasi-systolic array in a generalized configuration.
Figure 7:
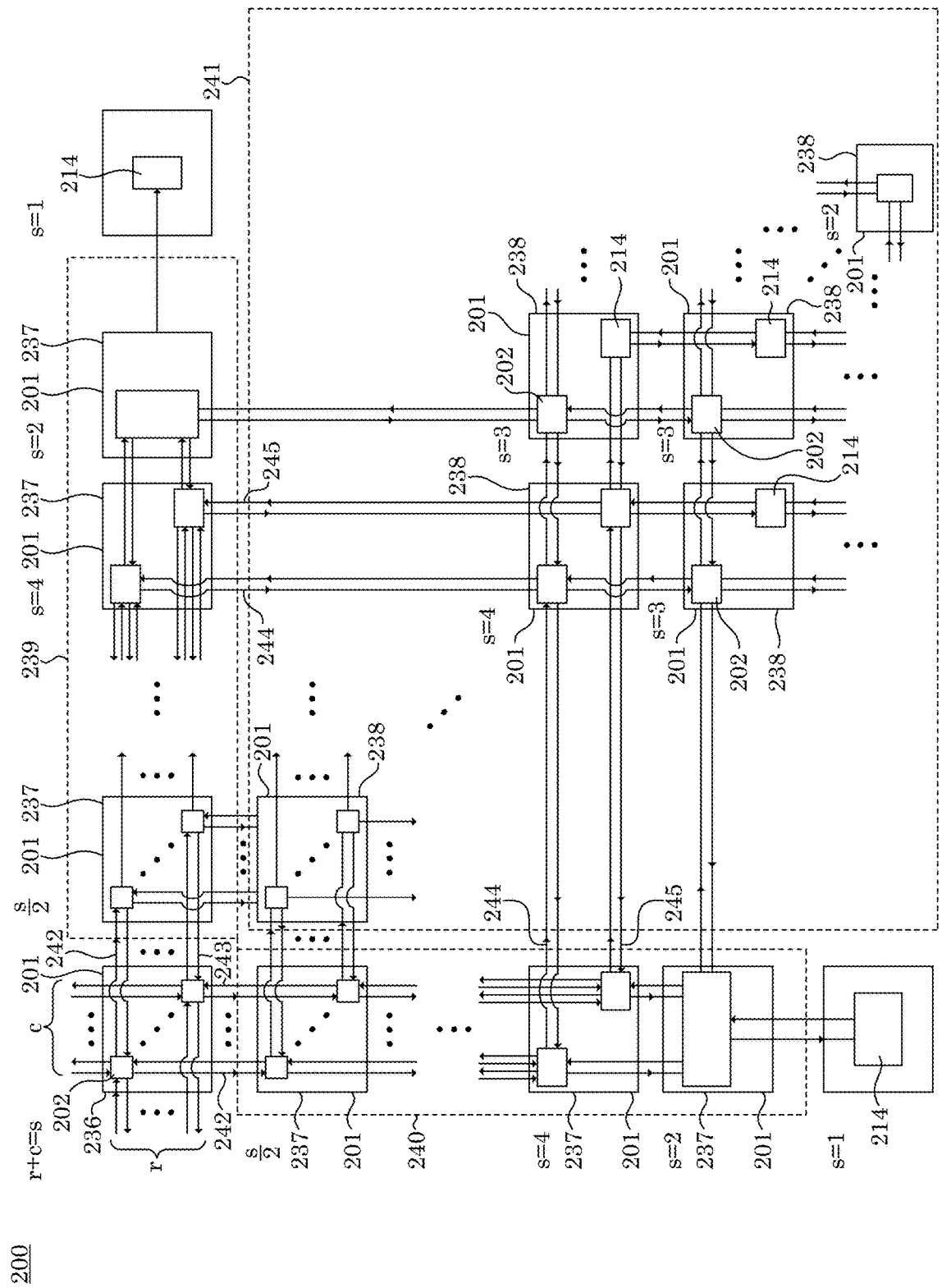
FIG. 7 shows a quasi-systolic array that includes an arbitrary number of forward input transmission lines of a primary quasi-systolic processor and corresponding numbers of edge quasi-systolic processors and interior quasi-systolic processors.

Data are communicated along various transmission lines, e.g., forward input transmission line 209, backward input transmission line 210, forward output transmission line 216, backward output transmission line 217, communication line 233, and the like. Such transmission lines independently can include a conductive metal line that includes copper, aluminum, or niobium or can include a wave guide that includes silicon nitride or silicon. Exemplary transmission lines include metallization layers in foundry silicon processes, or layers composed on printed circuit boards, or waveguides etched into silicon or composed of fiberoptic cables. Moreover, such lines can be encased in a planarized layer of dielectric. In an embodiment, transmission lines include includes a set of 8, 1 micron tall by 250 nm wide copper lines arrayed such that each line contains one bit of information. It should be appreciated that transmission lines interconnect quasi-systolic processors 201 in quasi-systolic array 200. With reference to FIG. 5, FIG. 6, and FIG. 7, adjacent quasi-systolic processors (201.1, 201.2) are configured such that first forward input transmission lines 209.1 connected to first quasi-systolic processor 201.1 receive and communicate first forward data 208.1 to first quasi-systolic processor 201.1 so that first primary processor 202.1 of first quasi-systolic processor 201.1 produces first forward output 212.1 from a combination of first forward data 208.1. Subsequently, first forward output 212.1 from first primary processor 202.1 in first quasi-systolic processor 201.1 is communicated in first forward output transmission line 216.1 from first quasi-systolic processor 201.1 to adjacent second quasi-systolic processor 201.2 that is in direct serial communication with first quasi-systolic processor 201.1. In this configuration, first forward output transmission line 216.1 of first quasi-systolic processor 201.1 becomes second forward input transmission line 209.2 of second quasi-systolic processor 201.2, and first forward output 212.1 is second forward datum 208.2 received by second primary processor 202.2. Accordingly, it should be appreciated that second backward input transmission lines 210.2 connected to second primary processor 202.2 of second quasi-systolic processor 201.2 receive and communicate second backward data 211.2 along second backward input transmission lines 210.2 to second quasi-systolic processor 201.2 so that second primary processor 202.2 of second quasi-systolic processor 201.2 produces second backward output 213.2 from a combination of second backward data 211.2. Subsequently, second backward output 213.2 from second primary processor 202.2 in second quasi-systolic processor 201.2 is communicated in second backward output transmission line 217.1 from second quasi-systolic processor 201.2 to adjacent first quasi-systolic processor 201.1 that is in direct serial communication with second quasi-systolic processor 201.2. In this configuration, second backward output transmission line 217.2 of second quasi-systolic processor 201.2 becomes first backward input transmission line 210.2 of first quasi-systolic processor 201.1, and second backward output 213.2 is first backward datum 211.1 received by first primary processor 202.1.

Data (e.g., forward datum 208, backward datum 211, dummy input data 234, dummy output data 235, and the like) are processed by forward linear transform processor 218, backward linear transform processor 219, in coordination with phase angle memory 220, phase angle accumulation memory 221, accumulation multiplier 223, accumulator controller 224, and dummy input member 225.

Forward linear transform processor 218 receives forward datum 208 and produces forward output 212. Forward linear transform processor 218 can include a transistor, polarization grating or crystal, interferometer, memory such as a resistive switch, static random access memory, magnetic tunnel junction, or flash memory, and the like to perform a rotation or other linear operation as can be performed by a 2 by 2 matrix multiplication and can be a CORDIC processor, a polarization rotator, or a crossbar array of resistive switches. Exemplary forward linear transform processors 218 a forward array of 1-48 shift and add registers arrayed to form a CORDIC processor or more specifically a forward array of 8 shift and add registers. Moreover, these systems can be mass produced using conventional silicon and non-silicon foundry processes. In an embodiment, forward linear transform processor 218 includes a series of 8 digital bit shift registers and 8 digital bit adders arrayed to perform a CORDIC vector matrix multiplication.

Wither reference to FIG. 3, phase angle memory 220 receives scaled accumulated phase 229 and counter signal 227 and produces phase angle 226 that is communicated to forward linear transform processor 218 and backward linear transform processor 219. Phase angle memory 220 can include static random access memory cells, dynamic random access cells, flash memories, resistive memories and magnetic tunnel junctions can store the information to determine how to linearly transform data within a forward linear transform processors 218 and can include a memory as described above or a combination of such memory. Exemplary phase angle memory 220 includes banks of static random access memory cells storing a 1 to 256 bit digital number. Moreover, phase memory can be updated or accessed to change the phase angle stored in the memory by the application of voltages or other signals to the phase angle memory. In an embodiment, phase angle memory 220 includes a bank of 8 static random-access memory cells composed of integrated transistors. Here, phase angle 226 can include multiple digital voltages levels, quantized quantities of charges, the orientation of a magnetic spin of one or more electrons, an analog or digital state of a memory such as a phase angle memory 220, or a temporal time delay between two events to represent the information of the phase angle to be passed to the forward linear transform processor 218 or the backward linear transform processor 219 and can be changed, e.g., updated, depending on the data flowing through the quasi-systolic array. Exemplary phase angle 226 includes 8 digital voltage levels from 0 V to 3.3 V or an analog value stored as resistance from 1 Kohm to 100 GOhm. Moreover, such phase angle can be transmitted in a way similar to forward datum 208 or backward datum 211 along transmission lines such as forward input transmission line 209 or backward input transmission line 210. In an embodiment, phase angle 226 includes a 4 bit digital voltage signal with 0 V being logical zero and 3.3 V being logical 1. Also, counter signal 227 can include multiple bit digital voltages, analog voltage signals, multiple bit photonic signals, analog photonic signals (encoded in either intensity or polarization), or spin waves that can be transmitted across a transmission line such as forward input transmission line 209. Exemplary counter signals 227 include a 4 bit digital voltage signal with 0 V being logical zero and 3.3 V being logical 1. Moreover, this digital signal can be any width in time from 1 ns to 1 s or more specifically from 10 ns to 100 ns. In an embodiment, counter signal 227 includes an electrical impulse from 0 V to 3.3 V with a 10 ns pulse width. Further, scaled accumulated phase 229 can include multiple digital voltages levels, quantized quantities of charges, the orientation of a magnetic spin of one or more electrons, an analog or digital state of a memory such as a phase angle memory 220, or a temporal time delay between two events to update the phase angle 226 stored within a phase angle memory 220 and can be changed or updated depending on the data flowing through the quasi-systolic array Exemplary scaled accumulated phases 229 include a 1-256 bit digital voltage signal with 0 V being logical zero and 3.3 V being logical 1 or more specifically a 4 bit digital voltage signal, or could be implemented with an analog value stored as resistance from 1 KOhm to 100 GOhm. Moreover, scaled accumulated phase 229 can be updated or accessed to change the phase angle stored in the memory by the application of voltages or other signals to the scaled phase angle memory. In an embodiment, scaled accumulated phase 229 includes 8 digital voltage levels from 0 V to 3.3 V.

Counter 222 communicates counter signal 227 to phase angle memory 220 and phase angle accumulation memory 221. Counter 222 can include a series of static random memory access cells, dynamic random access memory cells, nonvolatile memories such as resistive switches, magnetic tunnel junctions, or flash memories, a digital or analog adder that include transistors, a comparator composed of transistors, and the like to accumulate the number of cycles that have passed and upon reaching a threshold updating the phase angle memory 220. Exemplary counters 222 include 1 to 1024 bit static random access memory cells, a 1 to 2048 bit adder, a 1 to 2048 bit comparator or more specifically two banks of 4 bit to 8 bit static random access memory cells, a 8 bit to 16 bit adder, and a 8 bit to 16 bit comparator. Moreover, counter 227 can transmit data across a transmission line such as forward input transmission line 209 or other similar transition line. In an embodiment, counter 222 includes 16 static random access memory cells, a 16 bit adder and a 16 bit comparator.

Phase angle accumulation memory 221 receives counter signal 227, forward output 212, and accumulation reset signal 230 and produces accumulated phase 228 therefrom. Phase angle accumulation memory 221 can include static random access memory cells, dynamic random access cells, flash memories, resistive memories and magnetic tunnel junctions to store the information needed to determine how to linearly transform data within a forward linear transform processors 218 and can memory as previously described. Exemplary phase angle accumulation memory 221 include banks of static random access memory cells storing a 1 to 256 bit digital number. Moreover, this phase memory can be updated or accessed to change the phase angle stored in the memory by the application of voltages or other signals to the phase angle memory. In an embodiment, phase angle accumulation memory 221 includes a bank of 8 static random-access memory cells composed of integrated transistors. It is contemplated that accumulated phase 228 can include multiple digital voltages levels, quantized quantities of charges, the orientation of a magnetic spin of one or more electrons, an analog or digital state of a memory such as phase angle accumulation memory 221, or a temporal time delay between two events to represent the information of the phase angle to be passed to forward linear transform processor 218 or backward linear transform processor 219 and can be changed or updated depending on the data flowing through the quasi-systolic array. Exemplary accumulated phase 228 includes 8 digital voltage levels from 0 V to 3.3 V or an analog value stored as resistance from 1 Kohm to 100 GOhm. Moreover, such angle can be transmitted in a way similar to forward datum 208 or backward datum 211 along transmission lines such as forward input transmission line 209 or backward input transmission line 210. In an embodiment, accumulated phase 228 includes a 4 bit digital voltage signal with 0 V being logical zero and 3.3 V being logical 1.

Accumulator controller 224 communicates accumulated phase 228 to accumulation multiplier 223. Accumulator controller 224 can include a series of static random memory access cells, dynamic random access memory cells, non-volatile memories such as resistive switches, magnetic tunnel junctions, or flash memories, a digital or analog adder composed of transistors, a comparator composed of transistors, and the like to accumulate the number of cycles that have passed and upon reaching a threshold triggering the accumulated phase 228 to transfer to the accumulation multiplier 223. Accumulator controller 224 can include 1 to 1024 bit static random access memory cells, a 1 to 2048 bit adder, a 1 to 2048 bit comparator or more specifically two banks of 4 bit to 8 bit static random access memory cells, a 8 bit to 16 bit adder, and a 8 bit to 16 bit comparator. Moreover, accumulator controller 224 can transmit data across a transmission line such as forward input transmission line 209 or other similar transition line. In an embodiment, accumulator controller 224 includes a 16 static random access memory cells, a 16 bit adder and a 16 bit comparator. Accumulation multiplier 223 receives accumulated phase 228 and backward output 213 and produces scaled accumulated phase 229 therefrom. Accumulation multiplier 223 can include digital or analog multipliers composed of transistors, magnetic tunnel junctions, resistive memories, static random access memories, flash memories, or dynamic random access memories to multiply two numbers. Exemplary accumulation multiplier 223 include arrays of $1$-$10^6$ transistors, or more precisely 10-50 transistors. Moreover, these transistors are laid out consistent with Boolean algebra such that the inputs to the transistors cascade to produce the logical multiplication of the two input. In an embodiment, accumulation multiplier 223 includes a 16 bit digital Boolean multiplier circuit composed of transistors.

Backward linear transform processor 219 receives phase angle 226 and backward datum 211 and produces backward output 213. Backward linear transform processor 219 can include transistors, polarization gratings or crystals, interferometers, memories such as resistive switches, static random access memories, magnetic tunnel junctions, or flash memories to perform a rotation or other linear operation as can be performed by a 2 by 2 matrix multiplication and can be a CORDIC processor, a polarization rotator, or a crossbar array of resistive switches. Exemplary backward linear transform processor 219 includes a forward array of 1-48 shift and add registers arrayed to form a CORDIC processor or more specifically a forward array of 8 shift and add registers. Moreover, these systems can be mass produced using conventional silicon and non-silicon foundry processes. In an embodiment, backward linear transform processor 219 includes a series of 8 digital bit shift registers and 8 digital bit adders arrayed to perform a CORDIC vector matrix multiplication.

With reference to FIG. 4, in identity processor 214, forward linear transform processor 218 receives forward datum 208 along communication line 233, dummy input data 234, and zero phase angle 232 and produces dummy output data 235 therefrom. Dummy input data 234 can include multiple bit digital voltages, analog voltage signals, multiple bit photonic signals, analog photonic signals (encoded in either intensity or polarization), or spin waves to generate fixed information so that the processing is consistent despite the presence of a missing input. Exemplary dummy input data 234 include a 1 to 1024 digital voltage string composed entirely of zeros, or zero photons along an input photonic channel. The dummy input data 234 can include temporal pulse width from 100 picoseconds to 1 second, specifically from 10 nanoseconds to 1 microsecond, and more specifically from 10 to 50 nanoseconds. These patterns can include 1 bit to 256 bits or more specifically from 1 bit to 4 bits. The voltage composing the signals can be from −10 Volts to 10 Volts or more specifically from 0 Volts to 3.3 Volts. In photonic embodiments, these signals can be composed from 1 to $10^{12}$ photons or more specifically from 1 to 1000 photons. In an embodiment, dummy input data 234 includes an 8 digital bit string with 0 Volts being logical low and 3.3 Volts being logical high but with all of the members of the string being 0 Volts. Further, zero phase angle 232 can include multiple digital voltages levels, quantized quantities of charges, the orientation of a magnetic spin of one or more electrons, an analog or digital state of a memory such as a phase angle memory 220, or a temporal time delay between two events to represent the information of the phase angle to be passed to the forward linear transform processor 218 or the backward linear transform processor 219 and can be changed or updated depending on the data flowing through the quasi-systolic array. Zero phase angle 232 includes 8 digital voltage levels from 0 V to 3.3 V or an analog value stored as resistance from 1 Kohm to 100 GOhm. Moreover, such angle can be transmitted in a way similar to forward datum 208 or backward datum 211 along transmission lines such as forward input transmission line 209 or backward input transmission line 210. In an embodiment, zero phase angle 232 includes a 4 bit digital voltage signal with 0 V being logical zero and 3.3 V being logical 1 but because it is the zero phase angle all of the bits are logical zero. Dummy input member 225 communicates communication line 233 and can include a conductive metal line that can include copper, aluminum, or niobium or can include wave guides that include silicon nitride or silicon. Exemplary dummy input member 225 can include metallization layers in foundry silicon processes, or layers composed on printed circuit boards, or waveguides etched into silicon or composed of fiberoptic cables. Moreover, these lines are encased in a planarized layer of dielectric. In an embodiment, dummy input member 225 include includes a set of 8, 1 micron tall by 250 nm wide copper lines arrayed such that each line contains one bit of information.

Phase angle memory 220 communicates zero phase angle 232 to forward linear transform processor 218 and backward linear transform processor 219. Phase angle memory 220 can include static random access memory cells, dynamic random access cells, flash memories, resistive memories and magnetic tunnel junctions to store the information to determine how to linearly transform data within a forward linear transform processors 218 and can include different types of the above memories. Exemplary phase angle memory 220 includes banks of static random access memory cells storing a 1 to 256 bit digital number. Moreover, phase angle memory 220 can be updated or accessed to change the phase angle stored in the memory by the application of voltages or other signals to the phase angle memory. In an embodiment, phase angle memory 220 includes a bank of 8 static random-access memory cells composed of integrated transistors. Dummy output member 231 receives dummy output data 235. Dummy output member 231 can include static random access memory cells, dynamic random access cells, flash memories, resistive memories and magnetic tunnel junctions to store the dummy output data 235 and can include different types of the above memories. Exemplary phase angle memory 220 includes banks of static random access memory cells storing a 1 to 256 bit digital number. In an embodiment, dummy output member 231 includes a bank of 8 static random-access memory cells composed of integrated transistors.

Figure 10:
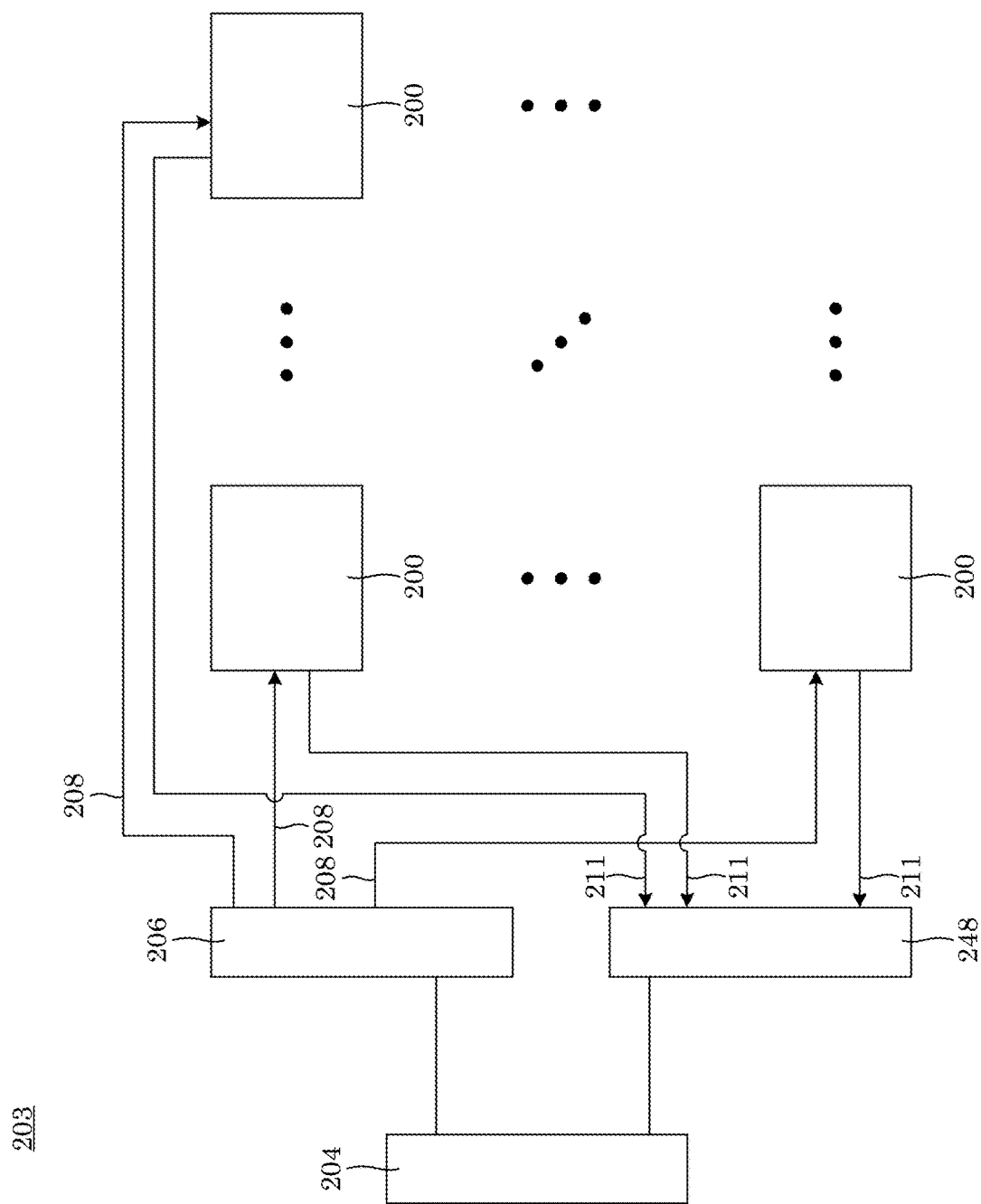
FIG. 10 shows a neuromorphic network that includes a quasi-systolic array.

In an embodiment, with reference to FIG. 10, quasi-systolic arrays 200 are in communication with forward data member 206 to receive forward datum 208 and in communication with backward data member 248 to communicate backward datum 211 thereto. forward data member 206 And backward data member 248 are in communication and under control of controller 204. Forward data member 206 can include volatile or nonvolatile memory elements such as static random access memories, magnetic tunnel junctions, resistive memories, flash memories, or dynamic random access memory to store new forward datum 208 type data or temporarily store already processed forward datum 208. Exemplary forward data member 206 includes $10$-$10^6$ nonvolatile or volatile memory units operating as a first-in-first-out buffer of data. Moreover, the memory can be accessed or overwritten at any time. In an embodiment, forward data member 206 includes 16,384 memory cells. Also, backward data member 248 can include volatile or nonvolatile memory elements such as static random access memories, magnetic tunnel junctions, resistive memories, flash memories, or dynamic random access memory so as to store new forward datum 208 type data or temporarily store already processed backward datum 211, Exemplary forward data member 206 include $10$-$10^6$ nonvolatile or volatile memory units operating as a first-in-first-out buffer of data. Moreover, the memory can be accessed or overwritten at any time. In an embodiment, forward data member 206 includes 16,384 memory cells. Further, controller 204 can include an arithmetic logic unit, a central processing unit, a field programmable gate array composed of integrated silicon or discrete printed circuit board components that can manage flow of data in and out of the quasi-systolic array as well as control the clocking of the system. Exemplary controller 204 includes arithmetic logic units and central processing units using. Moreover, these components can be integrated into silicon and fabricated out of transistors and have access to external sources of memory. In an embodiment, controller 204 includes a central processing unit based on a reduced instruction set processor.

Further, the quasi-systolic array can be assembled into a system in which the quasi-systolic array receives electrical power from which to provide current and voltage to all of its components, wherein controller 204 or edge forward output transmission line 216 or edge backward output transmission line 217 has access to external data inputs for which a desired action of the quasi-systolic array is to be computed. This system could be a single chip, system of chips, or chip packaged and integrated on a circuit board with adequate power for the quasi-systolic array operation. For digital embodiments, components can be synchronized to an external clock to provide arrival of data to correspond with its calculation.

Quasi-systolic array 200 can be made in various ways. In an embodiment, a process for making quasi-systolic array 200 includes the layout of an electronic or photonic circuit according to foundry design rules, the production of lithographic mask sets, the photolithographic patterning of a semiconductor wafer, the implantation of dopants into that wafer, followed by the oxidation or deposition of a gate oxide, or additional fabrication of metallization or wave guide layers for the wiring of the circuit information.

The process for making quasi-systolic array 200 also can include annealing of semiconductor wafer, the passivation of the wafer, the singulation and packaging of individual die from the wafer. For nonvolatile memories, it can include placement of nonvolatile memories within the metallization, wiring, or waveguide layers of the semiconductor wafer.

In an embodiment, a process for making quasi-systolic processor 201, primary processor 202, and identity processor 214 independently include the layout of an electronic or photonic circuit according to foundry design rules, the production of lithographic mask sets, the photolithographic patterning of a semiconductor wafer, the implantation of dopants into that wafer, followed by the oxidation or deposition of a gate oxide, and the additional fabrication of metallization or wave guide layers for the wiring of the circuit information.

The process for making quasi-systolic processor 201, primary processor 202, and identity processor 214 also can include annealing of semiconductor wafer, the passivation of the wafer, the singulation and packaging of individual die from the wafer. For nonvolatile memories, it can include the placement of nonvolatile memories within the metallization, wiring, or waveguide layers of the semiconductor wafer.

Quasi-systolic array 200, quasi-systolic processor 201, and primary processor 202 have numerous advantageous and unexpected benefits and uses. In an embodiment, with reference to FIG. 6, a process for performing streaming eigen-updates in a hardware neuromorphic network that includes quasi-systolic array 200 includes: receiving, by primary quasi-systolic processor 236 of quasi-systolic array 200, first forward datum 208 and second forward datum 208; producing, by primary quasi-systolic processor 236 from first forward datum 208 and second forward datum 208, first forward output 212 and second forward output 212; receiving first forward output 212 from primary quasi-systolic processor 236 by edge row bank 239, and serially iteratively transforming and reducing a dimensionality of first forward output 212 by the edge quasi-systolic processors of edge row bank 239 to produce third forward data for the interior quasi-systolic processors in interior bank 241; receiving second forward output 212 from primary quasi-systolic processor 236 by edge column bank 240, and serially iteratively transforming and reducing a dimensionality of second forward output 212 by edge quasi-systolic processors of edge column bank 240 to produce fourth forward data for interior quasi-systolic processor 238 in interior bank 241; receiving the third forward data and the fourth forward data by interior quasi-systolic processor 238 in interior bank 241 and producing first backward data from the third forward data and the fourth forward data and backward propagating the first backward data through the interior quasi-systolic processors in interior bank 241 by serially iteratively transforming the first backward data by the interior quasi-systolic processors to produce third backward data and fourth backward data; receiving second forward output 212 from primary quasi-systolic processor 236 by edge column bank 240, and serially iteratively transforming and reducing a dimensionality of second forward output 212 by edge quasi-systolic processors of edge column bank 240 to produce second backward data for interior quasi-systolic processor 238; receiving the third backward data from interior bank 241 by edge row bank 239, and serially iteratively transforming the third backward data by the edge quasi-systolic processors of edge row bank 239 to produce fifth backward data for primary quasi-systolic processor 236; receiving the fourth backward data from interior bank 241 and second backward data by edge column bank 240, and serially iteratively transforming the fourth backward data by the edge quasi-systolic processors of edge column bank 240 to produce sixth backward data for primary quasi-systolic processor 236; and receiving the fifth backward data from edge row bank 239 and the sixth backward data from edge column bank 240 by primary quasi-systolic processor 236, and transforming the fifth backward data and the sixth backward data by primary quasi-systolic processor 236 to produce final backward data to perform streaming eigen-updates in the hardware neuromorphic network. In the process for performing streaming eigen-updates, receiving, by the primary quasi-systolic processor 236 of the quasi-systolic array 200, first forward datum 208 and second forward datum 208 occurs by applying the signal information of these datums to the transmission lines and then propagating the information along the first forward input transmission line 209 and the second forward input transmission line 209.

In the process for performing streaming eigen-updates, producing, by primary quasi-systolic processor 236 from first forward datum 208 and second forward datum 208, first forward output 212 and second forward output 212 occurs by applying the forward datum 208 and second forward datum 208 to quasi-systolic processor 201 by accessing its forward input transmission line 209.1 and forward input transmission line 209.2. Applying forward datum 208 and second forward datum 208 activates forward linear transform processor 218 and reading the output of forward linear transform processor 218 as the values of first forward output 212 and second forward output 212. In an embodiment, inputs are transformed by a coordinate rotation digital computer implementing a series of additions and bit shifts to achieve a rotation by phase angle 226. At the end of this process, outputs appear spontaneously as a shift on the voltage levels of the output which can be read by probing of the values with a voltmeter or propagated in the quasi-systolic array.

In the process for performing streaming eigen-updates, receiving first forward output 212 from primary quasi-systolic processor 236 by edge row bank 239, and serially iteratively transforming and reducing a dimensionality of first forward output 212 by edge quasi-systolic processors of edge row bank 239 to produce third forward data for interior quasi-systolic processors in interior bank 241 occurs by applying the second forward datum 208 to quasi-systolic processor 201.B by accessing its forward input transmission line 209.1. Applying forward datum 208 activates the interior forward linear transform processor 218 and reading the output of the forward linear transform processor 6 as the values of the first forward output 212. In an embodiment, inputs are transformed by a coordinate rotation digital computer implementing a series of additions and bit shifts to achieve a rotation by the stored phase angle. At the end of this process, outputs appear spontaneously as a shift on the voltage levels of the output that can be read by probing values with a voltmeter or propagated in the quasi-systolic array.

In the process for performing streaming eigen-updates, receiving second forward output 212 from primary quasi-systolic processor 236 by edge column bank 240, and serially iteratively transforming and reducing a dimensionality of second forward output 212 by edge quasi-systolic processors of edge column bank 240 to produce fourth forward data for interior quasi-systolic processor 238 in interior bank 241 occurs by applying second forward datum 208 to a quasi-systolic processor 201.B by accessing its forward input transmission line 209. Applying forward datum 208 activates interior forward linear transform processor 218 and reading the output of forward linear transform processor 218 as the values of first forward output 212.1 and second forward output 212.2. In an embodiment, inputs are transformed by a coordinate rotation digital computer implementing a series of additions and bit shifts to achieve a rotation by the stored phase angle 226. At the end of this process, outputs appear spontaneously as a shift on the voltage levels of the output that can be read by probing values with a voltmeter or propagated in the quasi-systolic array.

In the process for performing streaming eigen-updates, receiving the third forward data and the fourth forward data by interior quasi-systolic processor 238 in interior bank 241 occurs by applying the signal information of these datums to the transmission lines and then propagating the information along second forward input transmission line 209.

In the process for performing streaming eigen-updates, producing first backward datum 211 by way of interior quasi-systolic processor 238 in interior bank 241 occurs by applying the third forward datum 208 and fourth third forward datum 208 to a quasi-systolic processor 201.A by accessing its forward input transmission line 209.1 and forward input transmission line 209.2. Applying forward datum 208 activates interior forward linear transform processor 218 and reading the output of the forward linear transform processor as values of first forward output 212.1 and second forward output 212.2. In an embodiment, inputs are transformed by a coordinate rotation digital computer implementing a series of additions and bit shifts to achieve a rotation by stored phase angle 226. This process can be repeated iteratively and in order across each of quasi-systolic processors 201.A until final quasi-systolic processor 201.A produces first backward datum 211 at its output at edge of interior bank 241 where outputs appear spontaneously as a shift on the voltage levels of the output that can be read by probing values with a voltmeter or backward propagated in the quasi-systolic array or exchanged with backward datum 211 of a neighboring quasi-systolic array 200 to be back-propagated.

In the process for performing streaming eigen-updates, producing second backward datum 211 from second forward data by way of edge quasi-systolic processors of edge column bank 240 occurs by applying second forward datum 208 to quasi-systolic processor 201.B by accessing its forward input transmission line 209.1. Applying forward datum 208 activates interior forward linear transform processor 218 and reading the output of the forward linear transform processor as the values of first forward output 212.1. In an embodiment, inputs are transformed by a coordinate rotation digital computer implementing a series of additions and bit shifts to achieve a rotation by stored phase angle 226. This process can be repeated iteratively and in order across each of quasi-systolic processor 201.B until final quasi-systolic processor 201.B produces second backward datum 211 at its output at the end of edge column bank 240 where outputs appear spontaneously as a shift on the voltage levels of the output that can be read by probing values with a voltmeter or backward propagated in the quasi-systolic array or exchanged with backward datum 211 of a neighboring quasi-systolic array 200 to be back-propagated.

In the process for performing streaming eigen-updates, producing third backward datum 211 and fourth backward datum 211 by way of interior quasi-systolic processor 238 in interior bank 241 occurs by applying first backward datum 211 to quasi-systolic processor 201.A. by accessing its backward input transmission line 210.1 and backward input transmission line 210.2. Applying backward datum 211 activates interior forward linear transform processor 218 and reading the output of backward linear transform processor 219 as the values of first backward output 213.1 and second backward output 213.2. In an embodiment, inputs are transformed by a coordinate rotation digital computer implementing a series of additions and bit shifts to achieve a rotation by stored phase angle 226. This process can be repeated iteratively and in order across each of the quasi-systolic processor 201.A until final quasi-systolic processor 201.A produces third and fourth backward datum 211 at its output at either edge of interior bank 241 where the outputs would appear spontaneously as a shift on the voltage levels of the output that can be read by probing values with a voltmeter or backward propagated to edge row bank 239 and edge column bank 240.

In the process for performing streaming eigen-updates, producing fifth backward data by edge quasi-systolic processors of edge row bank 239 occurs by applying the fourth backward datum 211 to a quasi-systolic processor 201.B by accessing its backward input transmission line 210.1 and backward input transmission line 210.2. Applying backward datum 211 activates interior forward linear transform processor 218 and reading the output of backward linear transform processor 219 as values of first backward output 213.1 and second backward output 213.2. In an embodiment, inputs are transformed by a coordinate rotation digital computer implementing a series of additions and bit shifts to achieve a rotation by stored phase angle 226. This process can be repeated iteratively and in order across each of quasi-systolic processor 201.B until final quasi-systolic processor 201.B produces fifth backward datum 211 at its output at edge of edge row bank 239 where outputs appear spontaneously as a shift on the voltage levels of the output that can be read by probing values with a voltmeter or backward propagated to primary quasi-systolic processor 236.

In the process for performing streaming eigen-updates, producing sixth backward data by way of edge quasi-systolic processors of edge column bank 240 occurs by applying second backward datum 211 and fourth backward datum 211 to quasi-systolic processor 201.B by accessing its backward input transmission line 210.1 and backward input transmission line 210.2. Applying backward datum 211 activates interior forward linear transform processor 218 and reading the output of backward linear transform processor 219 as values of first backward output 213.1 and second backward output 213.2. In an embodiment, inputs are transformed by a coordinate rotation digital computer implementing a series of additions and bit shifts to achieve a rotation by stored phase angle 226. This process can be repeated iteratively and in order across each of quasi-systolic processor 201.B until final quasi-systolic processor 201.B produces sixth backward datum 211 at its output at edge of edge column bank 240 where outputs appear spontaneously as a shift on the voltage levels of the output that can be read by probing values with a voltmeter or backward propagated to primary quasi-systolic processor 236.

In the process for performing streaming eigen-updates, producing final backward data by way of primary quasi-systolic processor 236 occurs by applying fifth backward datum 211 and sixth backward datum 211 to quasi-systolic processor 201.A by accessing its backward input transmission line 210.1 and backward input transmission line 210.2. Applying backward datum 211 activates interior forward linear transform processor 218 and reading the output of backward linear transform processor 219 as values of first backward output 213.1 and second backward output 213.2. In an embodiment, inputs are transformed by a coordinate rotation digital computer implementing a series of additions and bit shifts to achieve a rotation by stored phase angle 226. This process can be repeated iteratively and in order across each of quasi-systolic processors 201.A until final quasi-systolic processor 201.A produces final backward datum 211.

Quasi-systolic array 200, by virtue of its action of forward and backward propagating data, stores within phase angle 226 of each quasi-systolic processor 201 information concerning the data that passed through the array that could be an eigenvector, or singular vector, or principal component of the data. The accuracy of this data depends on the latency, or time for forward and backward passes to complete, of the array, and quasi-systolic array 200 has an advantage of low latency and high speed of propagation. Quasi-systolic array 200 is both fast and accurate. In addition, eigenvectors, or singular vectors, or principal components of the data represent an efficient form of compression of data that can be data from a neuromorphic computer or accelerator and that provides for efficient operation of a neuromorphic computer or accelerator.

Quasi-systolic array 200 and processes disclosed herein have numerous beneficial uses, including compression of batch training data in artificial neural networks, compression of artificial neural network training data for transmission during model synchronization in data centers or federated learning across wireless networks, subspace tracking of incoming radar signals from phase arrays, and extraction of principal components for time series data. Advantageously, quasi-systolic array 200 overcomes limitations of technical deficiencies of conventional compositions such as slow speed of training, reduced accuracy from large batches due to slow speed of training, more efficient utilization of memory resources, and smaller size and energy consumption due to fewer numbers of calculations. Further, quasi-systolic array 200 can scale to much larger sizes than conventional approaches due to the exponential relationship between size and time in the quasi-systolic array 200 operation.

With reference to FIG. 11, a process for training a neuromorphic network is shown with benefits from quasi-systolic array 200 being shown for training the neuromorphic network. For input data $\vec{x}$ passed into neural network layer $\hat{W}_1$ whereupon output data $\vec{y}$ is produced and passed into a nonlinear function $r(\vec{y})$ whereupon the output of $r(\vec{y})$ is passed into neural network layer $\hat{W}_2$ where the process of propagation is repeated until the input data $\vec{x}$ is classified. When the accuracy of the classification of $\vec{X}$ is determined, $\vec{\delta}$ is backpropagated through the array to communicate the error or accuracy of the classification. For each layer in the neuromorphic network, once $\vec{\delta}$ and $\vec{x}$ are both known, $\hat{W}^{i,j}=\hat{W}^{i,j}-\eta\,\vec{\delta}^i\vec{x}^j$, wherein i and j are row and column indexes of $\vec{W}$, and η is a small constant. For a single pair of $\vec{x}$ and $\vec{\delta}$, this is stochastic gradient descent (SGD) and involves m+n units of memory, wherein m is a dimension of $\vec{x}$, and n is a dimension of $\vec{\delta}$. For B pairs of $\vec{x}$ and $\vec{\delta}$ for updating the neuromorphic network, the update is $$\hat{W}^{i,j} = \hat{W}^{i,j} - \frac{\eta}{B}\sum_{p=1}^{B}\vec{\delta}_p^i\vec{x}_p^j$$

that is referred to as minibatch stochastic gradient descent and involves m×n memory units. However, when quasi-systolic array 200 performs minibatch gradient descent, data are represented by compressed singular vectors $\vec{X}$ and $\vec{\Delta}$, known as eigenupdates and stored as phase angles 226 in the array. Here, k pairs of vectors correspond to each of k columns in quasi-systolic array 200. Performing an update such that $\hat{W}^{i,j}=\hat{W}^{i,j}-\eta\Sigma_{p=1}^{k}\vec{\Delta}_p^i\vec{X}_p^j$ involve k(m+n) memory and is less than m+n units used by minibatch gradient descent.

Quasi-systolic array 200 and processes herein unexpectedly provide a more memory efficient way to perform minibatch gradient descent than conventional articles. Moreover, quasi-systolic array 200 can employ different operational modes to compress other machine learning algorithms or represent compression of data using other methods besides singular value decomposition such as principal component analysis or nonnegative matrix factorization.

The articles and processes herein are illustrated further by the following Examples, which are non-limiting.

EXAMPLES

Example 1. Schematic Operation of On-Line Update Matrix Decomposer Architecture for Machine Learning Hardware A quasi-systolic array for update management of a neural network involves computing a low rank approximation of the update of a neural network using online streaming that can be used for non-volatile storage media that implement a neuromorphic network. The quasi-systolic array uses a guess for a low rank approximation of the update. The quasi-systolic array receives two sets of inputs that can include an input vector and an error vector for each layer of a neural network in addition to an estimation of the low-rank approximation. Using these inputs and a previous estimate, the quasi-systolic array determines a new, best guess that is used when the quasi-systolic array performs the operation again. In this way, quasi-systolic array performs a continuous set of operations with each new set of inputs and continuously refines the initial low rank approximation from which it started. This low-rank approximation is a compressed representation of the update that is performed on the neural network.

Such a compressed representation allows for reducing storage and computational resources for the update which leads to high energy efficiency of the update. It also reduces the number of write operations that need to be performed on the non-volatile storage medium in question, hence extending its lifetime and endurance. The computing method proposed may be implemented with digital or analog components.

Figure 14:
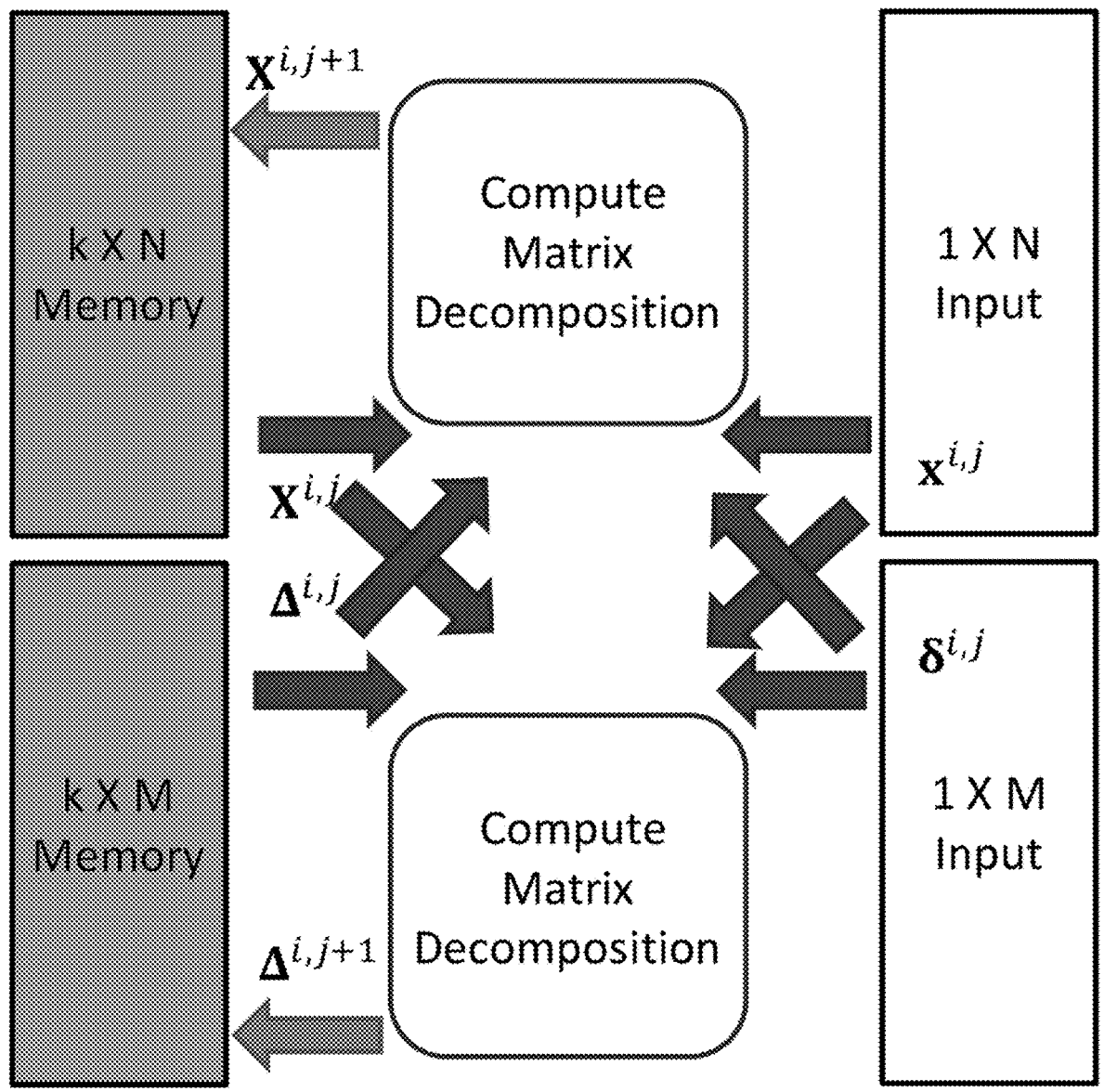
FIG. 14 shows a matrix decomposition machine, wherein streaming input data ($x^{i,j}$ and $\delta^{i,j}$) is combined with short-term memory block in a Compute Matrix Decomposition block. The output of this block updates the k×N memory block and the k×M memory block.

The quasi-systolic array can include an update matrix decomposer architecture for machine learning hardware shown in FIG. 13 and FIG. 14. The quasi-systolic array store predictions of an N×M memory array in memory arrays $X^{i,j}$ and $\Delta^{i,j}$ as shown in FIG. 13. Additional memory arrays can be used to store singular values or other scalars to scale the values in the memory arrays. These values program the N×M array or predict its future state for other calculations. $X^{i,j}, \Delta^{i,j}$, and additional scalars represent a k-rank matrix decomposition of a future state of the N×M array. The additional scalars can be singular values, learning rates, or additional matrix decomposition values.

Index i is a randomly selected batch of training data streaming into quasi-systolic array. Index j corresponds to a member of a selected batch, wherein, for each member of the batch, a transformation on $X^{i,j}$ and $\Delta^{i,j}$ is calculated and short-term memory arrays are updated with newly calculated values $X^{i,j+1}$ and $\Delta^{i,j+1}$. The calculation takes as inputs, $X^{i,j}$ and $\Delta^{i,j}$, which are the present values of the arrays, $x^{i,j}$ and $\delta^{i,j}$, which are input data streams corresponding to an input to the training batch, and any additional constants or calculated scalar values and vectors from the matrix decomposition.

After a batch is completed or otherwise terminated, the N×M memory is updated using the k×N memory, the k×M memory, and any additional scaling values or vectors.

Example 2. Utility of Streaming Batch Eigenupdates for Hardware Neuromorphic Networks Neuromorphic networks based on nanodevices, such as metal oxide memristors, phase change memories, and flash memory cells, have generated considerable interest for their increased energy efficiency and density in comparison to graphics processing units (GPUs) and central processing units (CPUs). Though immense acceleration of the training process can be achieved by leveraging the fact that the time complexity of training does not scale with the network size, it is limited by the space complexity of stochastic gradient descent, which grows quadratically. A quasi-systolic array reduce space complexity by using low-rank approximations of stochastic gradient descent. This low spatial complexity combined with streaming methods allows for significant reductions in memory and compute overhead and provide improvements in area, time, and energy efficiency of training. The quasi-systolic array provides streaming batch eigenupdate (SBE) in a neuromorphic network.

Deep neural networks (DNNs) are popular in a fields from image recognition to natural language processing. These systems have enormous computational overhead, particularly on multiply and accumulate (MAC) operations, and specialized hardware were made to accelerate these tasks. As the networks are themselves tolerant to noise and low precision computing (4-bit and below), theoretical and experimental investigations have shown that analog implementations of DNNs using Ohm's and Kirchhoff's laws to perform MAC operations can vastly accelerate the training and reduce the energy of inference by orders of magnitude.

Investigations regarding an appropriate nanodevice suitable for analog inference have focused on different families of 2-terminal memory devices (memristors, resistive random-access memory (ReRAIVI), phase change memories (PCM), etc.) as well as 3-terminal devices (flash memory, lithium insertion). These devices have the desirable properties of analog tunability, high endurance, and long-term memory needed for use in embedded inference applications. Applications based on these devices perform well when used for inference and have been well studied, with intermediate scale systems having been built by integrating devices into crossbar arrays.

Though effort has been focused on building inference engines, work has begun to address difficulties in training such nanodevice arrays. In crossbar architectures, there are two approaches to updating the weights. The first, which fits well with weights computed in software, is to sequentially update each weight separately. The other, called an outer product update, is to update all the weights simultaneously with two vectors of voltages or voltage pulses. This latter approach is limited in the type of updates that can be applied, but its speed and energy advantage essentially preclude the use of the former in practical applications. The quasi-systolic array provides outer product updates that approach training fidelity available for algorithms based on sequential weight updates, which are often employed in software-based platforms.

Crossbar array architectures have O(1) complexity for operations inference and update. For a suitably parallelized architecture, the number of clock cycles needed for these operations is independent of the size of the memory arrays in each layer. For inference, this is not a problem, but for matrix updates, this limits the training algorithm to stochastic gradient descent (SGD), since this is the only algorithm which uses rank 1 outer product updates alone. This approach does not allow independent updates of each element; therefore, a complete high rank update of a whole crossbar would require a series of these outer product updates. Though SGD is a powerful method for training, other methods, employed in software, such as momentum, Adagrad, or, most simply, batch update can sometimes be superior. However, these require additional memory overhead or explicit look-a-head updates of the memory.

Mini-batch gradient descent (MBGD), as the simplest possible modification of SGD, is of extreme interest, particularly in the case of nanodevice arrays. It has been suggested that it can increase tolerance with respect to device nonidealities, as well as be employed to minimize the number of device updates, which can be a problem in systems with low endurance or high energy to program. In PCM arrays, minimizing the number of updates is involved in preventing a hard reset when the device reaches its natural conductance limit. Additionally, in cases where the energy of inference is significantly less than the energy of update, reducing the number of updates could result in a substantial decrease in the energy required to train the network, even if it occurs at the expense of training time.

Streaming batch eigenupdates by a quasi-systolic array provide batch update, wherein a batch is broken up into a smaller number of principal components that are subsequently used to train the network. The streaming batch eigenupdates provided by the quasi-systolic array provide benefits of batch update and involve substantially less overhead and have a significantly lower computational cost than conventional systems.

The streaming batch eigenupdate provided by the quasi-systolic array estimates representative single outer product update for the batch. This approach is fast and minimizes the amount of information that is stored to make each update. An arbitrary network layer is trained on batch i with an a×b weight matrix $w^i$. The layer receives j activations $x^{i,j}$ of dimension b and backpropagated errors $\delta^{i,j}$ of dimension a per batch. In the ideal case, we would like the network to update according to $$w^{i+1} = w^i + \Delta \hat{w}^i,$$

where the batch average update $\Delta \hat{w}^i$ is a sum of outer products, $$\Delta \hat{w}^i = -\frac{\eta}{n} \sum_{j=1}^{n} \delta^{i,j} [x^{i,j}]^T.$$

Each term in this sum is the gradient of the loss function of that input $x^{i,j}$, which ais a rank 1 matrix. The sum of the gradients, $\Delta\hat{w}^i$, is the gradient of the batch loss function and is in general a rank n matrix. Performing such an update with conventional SGD includes n outer product operations. The outer product operation itself is a rank 1 operation, and hence an efficient alternative would entail using a low rank matrix approximation of $\Delta\hat{w}^i$ to reduce the total number of updates performed. More specifically, k<n outer product updates are performed, wherein k is the number of significant singular values of the true gradient $\Delta w^i$.

Performing the singular value decomposition (SVD) of $\Delta w^i$ entails significant memory overhead and computational cost. One solution involves employing unsupervised techniques such as streaming principal component analysis (PCA) to extract the k most significant singular vectors of a streaming covariance matrix. An algorithm for PCA describes evolution of neural network weights. By applying his formalism here on the weight updates, we can extract, on the fly, a set of k most representative vectors, of the original rank n update. This allows us to perform memory limited batch updates with k(a+b) additional memory units instead of axb as used in previous studies. This amounts to using a separate unsupervised neural network to train the network of interest, but this network trains on the batch gradient and involves very short-term memory as the gradient is constantly changing.

For a case of k=1, define an approximation for $\Delta w^i$, $\Delta\hat{W}^i$, in terms of left and right singular unit vectors $X^i$ and $\Delta^i$ corresponding to the largest singular value, $\sigma^i$. The rank 1 approximation, which we call the principal eigenupdate of the batch, is then:

$$\Delta \hat{W}^i \approx -\eta \sigma^{i^2} \Delta^i [X^i]^T.$$

This represents the single best rank 1 approximation of the batch update, with $\eta$ the traditional learning rate. These values can be estimated over a streaming batch of size n such that $$X^i \approx \frac{X^{i,n}}{\|X^{i,n}\|}, \Delta^i \approx \frac{\Delta^{i,n}}{\|\Delta^{i,n}\|},$$

and $\sigma^i \approx \sigma^{i,n}$ using the following update rules where j runs from 1 to n:

$$X^{i,j+1} = \frac{j}{j+1} X^{i,j} + \frac{1}{j+1} x^{i,j} \frac{(\delta^{i,j} \cdot \Delta^{i,j})}{\|\Delta^{i,j}\|}$$

$$\Delta^{i,j+1} = \frac{j}{j+1} \Delta^{i,j} + \frac{1}{j+1} \delta^{i,j} \frac{(x^{i,j} \cdot X^{i,j+1})}{\|X^{i,j+1}\|}$$

$$\sigma^{i,j+1^2} = \frac{j}{j+1} \sigma^{i,j^2} + \frac{1}{j+1} \frac{(x^{i,j} \cdot X^{i,j+1})}{\|X^{i,j+1}\|} \frac{(\delta^{i,j} \cdot \Delta^{i,j+1})}{\|\Delta^{i,j+1}\|}$$

Afterwards the weight matrix is updated using the rank 1 estimators of the singular values. The next batch is calculated from the end condition of the previous batch such that $X^{i+1,1}=X^{i,n}$, $\Delta^{i+1,1}=\Delta^{i,n}$, and $\sigma^{i+1,1}=\sigma^{i,n}$. The previous best estimate is presumed to approximate the subsequent best estimate, which is true if the learning rate is sufficiently small.

This algorithm falls within a general family of noisy power iterations, or power iterations performed on stochastic matrices, which are known to extract the eigenvectors of covariance matrixes. It is, additionally, a bi-iterative method for calculating both left and right eigenvectors.

The algorithm can be interpreted as updating the weighted average activation and error based on the cross significance of its companion term. For example, the estimated activation of the layer, $X^{i,j}$, is rotated significantly by $x^{i,j}$ subject to the condition that $$\frac{(\delta^{i,j} \cdot \Delta^{i,j})}{\|\Delta^{i,j}\|}$$

is large. If the error then of any particular input is small or pointing in an uncommon direction, the estimated activation does not change significantly. The same is true for $\Delta^{i,j+1}$. This algorithm, in the context of estimating the SVD of a batch update matrix using streaming data, we call the streaming batch eigenupdate (SBE) algorithm.

A feature of this approach is that it opens a tradeoff space between the software and the hardware. On one hand, it throws away a significant amount of the information from the batch, which results in a low rank approximation. Hence, for updates with higher rank, larger eigenvalue matrixes would be less well represented and therefore take a longer time to converge. On the other hand, this approximation, which is a form of compression, allows for a much more compact representation of the error, which has the potential to dramatically reduce hardware costs. One point to note here is that the smaller the rank of the weight update, the more representative a low rank approximation would be. Consequently, we might expect the eigenupdate to perform better for activation functions that lead to sparse updates, such as for rectifying activation functions like rectified linear units (ReLU).

Figure 15:
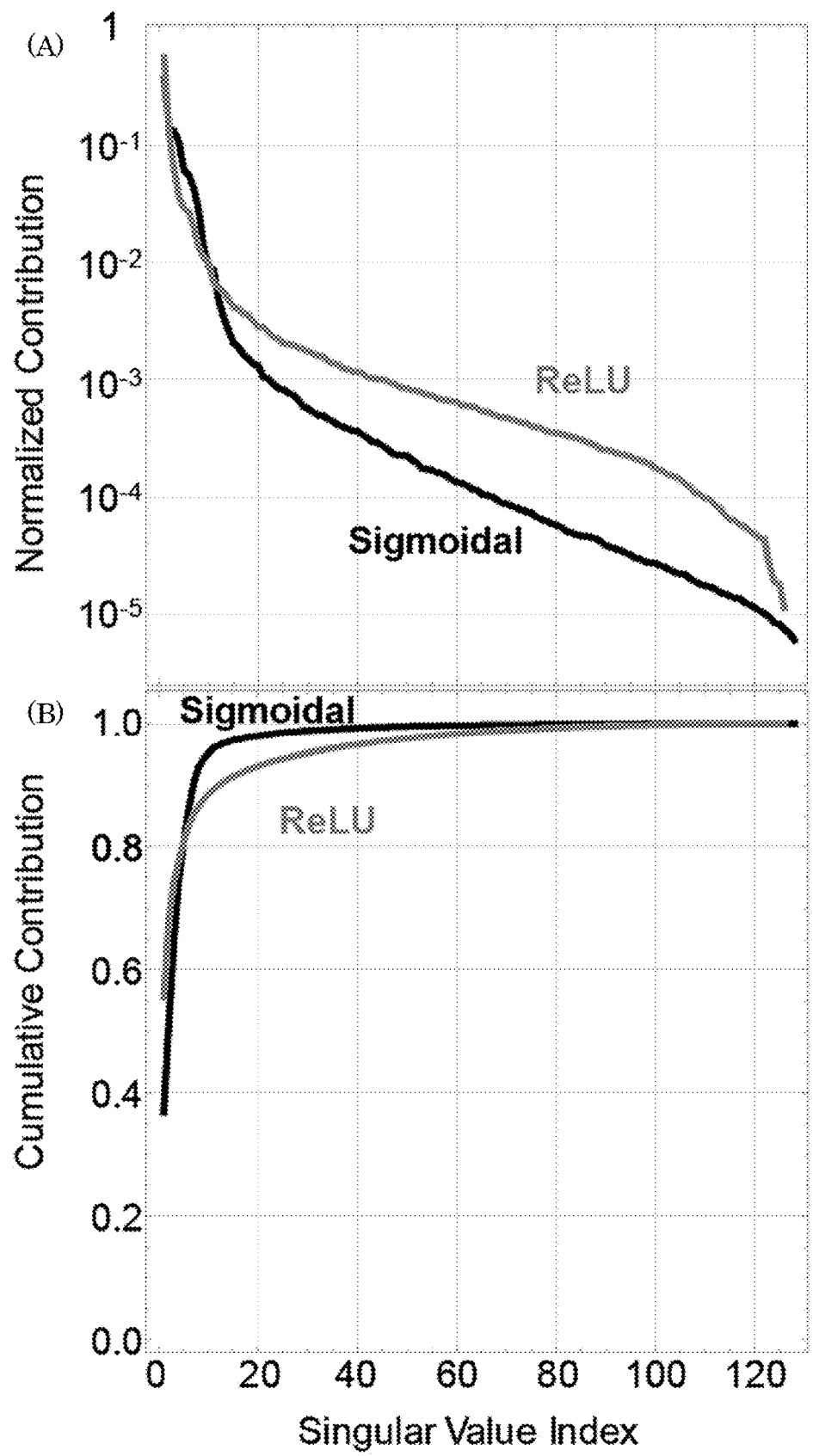
FIG. 15 shows (A) show a graph of normalized contribution versus singular value index for an example of normalized singular values of a middle layer of a 728×256× 128×10 network trained for MNIST with ReLU and sigmoidal activation, wherein a batch size was 10 000. Panel B shows a graph of cumulative contribution versus singular value index for a cumulative sum of singular values, wherein the sum of the first few vectors approached the total sum of one and include most of the batch information.

FIG. 15 shows an example of the effectiveness of the quasi-systolic array prior to running network models. It shows the relative significance of different singular values, subject to the normalizing condition $\Sigma_{p=1}^{r} \sigma_p^2 = 1$ for singular index value p up to rank r. The plots show a representative matrix decomposition for a particular batch update in the middle of a conventional 728×256×32×10 network trained on MNIST to 90% accuracy for the test set. Based on the relative magnitude of values for our example batch, ReLU activations can have as much as 60% of the batch information contained in the first pair of singular vectors. From the cumulative contribution, we can see for sigmoidal activation, which squashes the outputs of the neurons, the first 10 pairs of singular vectors can capture as much as 95% of the information contained within our example batch. We attribute this fact ultimately to the fact that despite the large sizes of matrixes in these networks, the complexity of the trajectories will ultimately be limited by significantly smaller number of classes which are used to train the networks.

Figure 16:
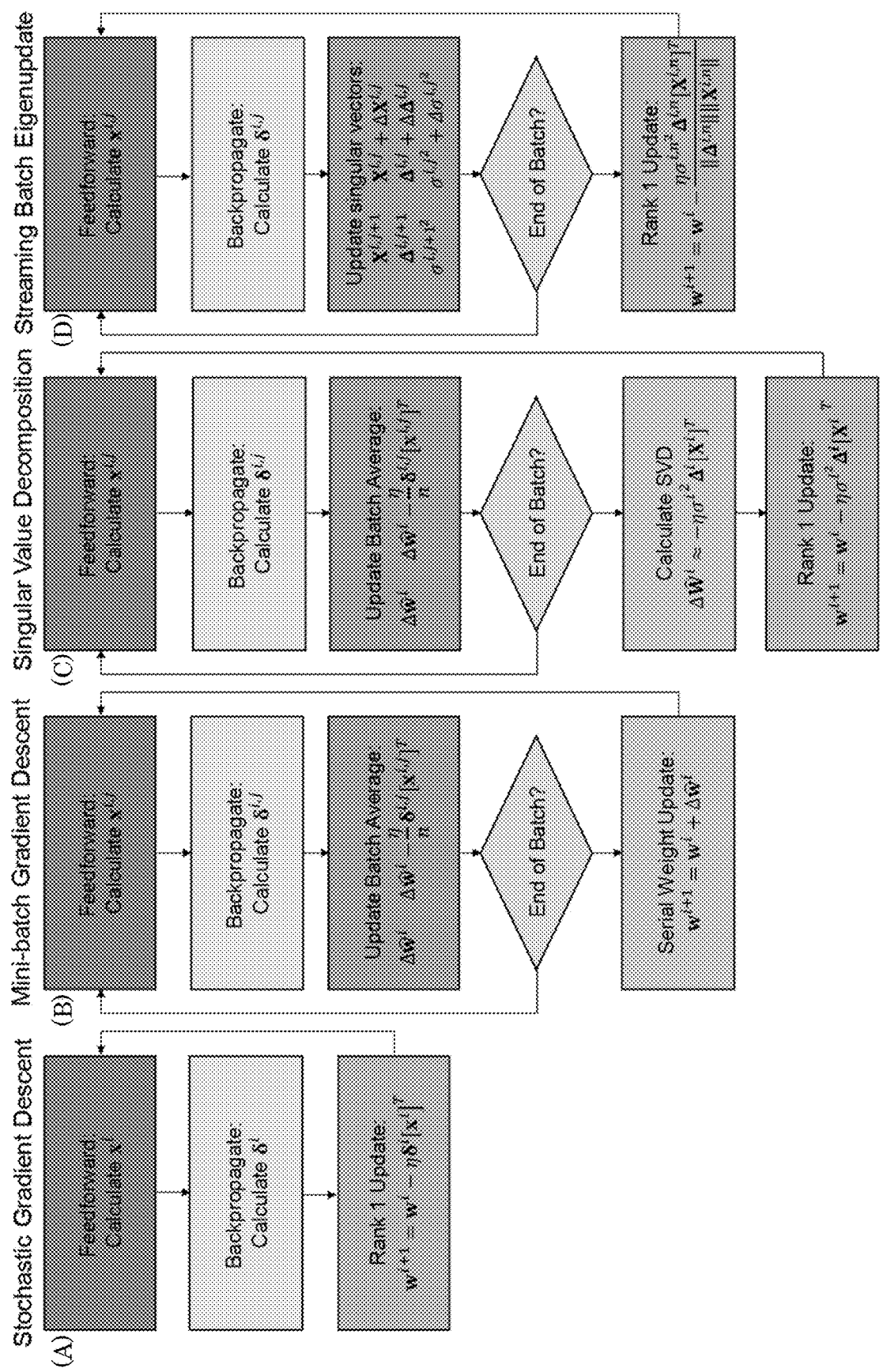
FIG. 16 shows a comparison of training algorithms for (A) stochastic gradient descent (SGD), (B) mini-batch gradient descent (MBGD), (C) singular value decomposition (SVD) approximation of a batch, and (D) streaming batch eigenupdates (SBE), wherein SGD and SBE are rank 1 and calculated on the fly and provide a highest degree of acceleration.

For experiments in this Example, we compare traditional approaches, stochastic gradient descent (SGD) and mini-batch gradient descent (MBGD), with our PCA based approaches, specifically doing the singular value decomposition (SVD) and the streaming batch eigenupdate (SBE) estimation of the batch between matrix updates. While MBGD and SVD cannot be efficiently implemented, SGD and SBE can. FIG. 16 outlines the key distinctions in the process execution of the algorithm.

To compare these approaches, we choose a very simple network architecture of 728×100×10 neurons, using ReLU activation functions between layers and a cross-entropy loss function. To control for the fact that using batches reduces the overall number of updates per epoch, we use a learning rate optimizer prior to network simulations, which minimizes the loss for 5 epochs. There is a hard cutoff terminating our simulations after 900 epochs. Batch sizes were varied from 20 to 213. Networks are trained on the MNIST data set using the typical test-training partition. The exemplary series of networks trained below all began from the same randomly drawn starting condition.

To illustrate the convergence of the SBE algorithm during the batch training process, we calculate the error, ε, for the converging the singular vectors, $X^{i,j}$, to the true singular vectors, $X^i$, as $$\varepsilon = 1 - \text{abs}\left(\frac{(X^i \cdot X^{i,j})}{\|x^{i,j}\|}\right),$$

and similarly for the singular value as $$\varepsilon = 1 - \text{abs}\left(\frac{\sigma^{i2}}{\sigma^{i,j2}}\right) \cdot 1$$

Figure 17:
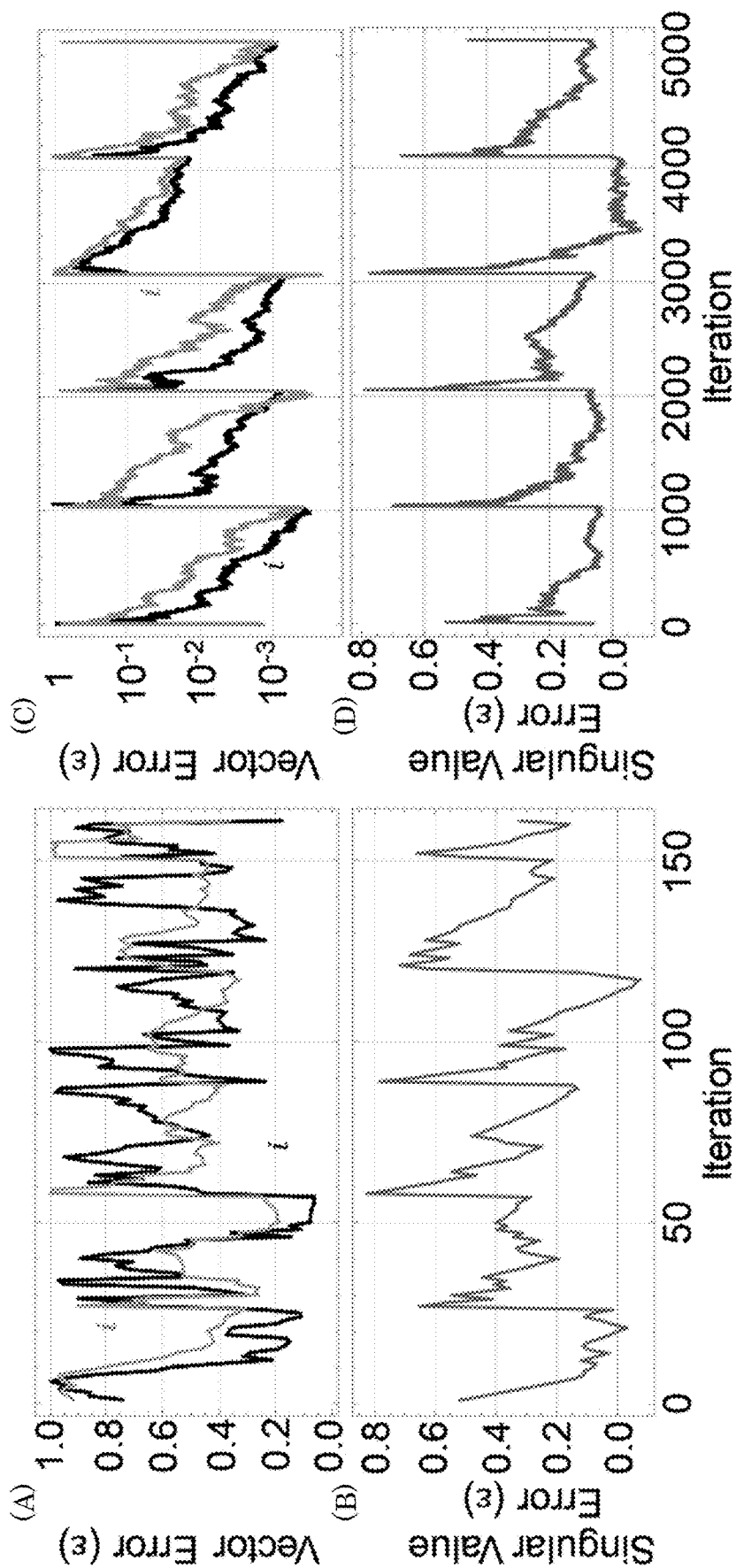
FIG. 17 shows a difference between SBE values and the full SVD values for (A) and (C) singular vectors $X^i$ and $\Delta^i$ for $$\varepsilon = 1 - \text{abs}\left(\frac{(X^i \cdot X^{i,j})}{\|x^{i,j}\|}\right)$$

FIG. 17 shows convergence curves of these errors during network training for batch sizes 32 and 1024. While 1024 shows strong periodic behavior between updates and convergence of the singular vectors down to an accuracy below 10-3, the smaller batch size of 32 shows periodic behavior but no strong trends toward convergence of the approximate singular vector. Despite this weak convergence of the singular vector, the training of the network converges.

Convergence of the singular vectors is not involved to demonstrate convergence of the network. Convergence of vectors during power iterations is determined by the eigengap, or the gap between the target eigenvalue and the next smallest eigenvalue of a matrix. A small eigengap leads to significant contamination of the target vector with other large eigenvalue vectors. This contamination complicates finding the eigenvector itself but still pushes a network to a lower value of the loss function.

FIG. 18 shows that all the training algorithms reduce the training set loss function down to as low as 10-4. We find that reducing the training set loss down to 10-2 is sufficient to achieve 100% accuracy on the training set and therefore about 97% to 98% accuracy on the test set. In these simulations, the SGD function is the fastest algorithm for training in terms of number of epochs, with MBGD, due to its parallelism, having significantly faster wall clock time. When re-plotting the data in terms of matrix updates, it's clear that the batch methods have an advantage in terms of minimizing the number of times the memory is changed. However, these measures do not consider the time to do the matrix updates in hardware. Since the SVD and SBE methods use only rank 1 updates, it takes less time for them to update the hardware by a factor of the number of elements in the crossbar.

These general trends can be seen in FIG. 19, which shows the number of epochs and number of matrix updates needed to train the network to a training set loss of both 10-1 and 10-2. For this example, MBGD is clearly the highest performing on all metrics, decreasing the number of updates needed to train the network vs. SGD by more than two orders of magnitude at a batch size of 4096. For the SBD and SBE algorithms, the epochs to train grows much faster, and the number of matrix updates needed to train only falls by a factor of 20 compared to SGD and does so at a much smaller batch size of 128. For very small batch sizes, the SBE algorithm performs worse than the SVD algorithm, which we attribute to poor qualities of the update vector, but at higher batch sizes it outperforms the SVD algorithm, which is attributed to a mixture of better update quality but with added stochasticity lacking in the SVD approach due to the random degree of convergence and sampling of lower significance eigenupdates and singular vectors.

For below, the SBE approach is lower performing than the MBGD approach in terms of number of epochs to train and number of matrix updates. However, its use would vastly accelerate the wall clock time of training in a hardware network since the transfer of the weights has the same complexity as the SGD approach, even in cases where the batches were stored in a local and parallel short-term memory array. Moreover, in the case of k=1, calculating and storing the low rank versions of activations and error (left and right eigenvalues) take up significantly less area and compute (O(a+b)) as compared to the full rank (O(a×b)) versions.

If a higher quality update were desired, the above algorithm could be extended to the calculation of multiple eigenupdates in parallel, similar to an Oja asymmetrical subspace network. The application of k eigenupdates would still be significantly faster than the time needed to transfer the point-wise or column-wise transfer for a full ranked batch update. Based on FIG. 15, a full rank transfer is unnecessary and possibly even detrimental if excess information leads to over fitting.

A challenge is determining the most efficient hardware implementation of the SBE algorithm. The major operations involved include summation, multiplication and division. Among them the most computationally intensive part is the normalization operation, $x^{i,n}/\|x^{i,n}\|$. Since we may only be working with low precision, such as 4-bit precision, and only dealing with a linear number of computations vs. problem size, the overhead of implementing these operations is significantly smaller when compared to their full rank counterparts. Digital implementations of such operations can be constructed with systolic array approaches or by quasi-systolic array, and if further energy efficiency is required, analog approaches can be used as well.

An alternate analog approach which gets rid of the division operation altogether is borrowed from the original Taylor series formulation of the Oja equations, which replaces division with a multiplication and subtraction. Such a calculation, though, may run into issues with numerical stability. However, the physical constraints of the system along with the parallel calculation of additional singular vectors could stabilize the algorithm. Calculating multiple singular vectors accelerates convergence of the dominant vectors. Moreover, future hardware could likely use short term memory cells, such as trench capacitors and FET's, to perform resistive multiplication and dot product operations in combination with Gilbert cells to scale the outputted values properly.

Comparative Example 1. Systolic Array

Figure 12:
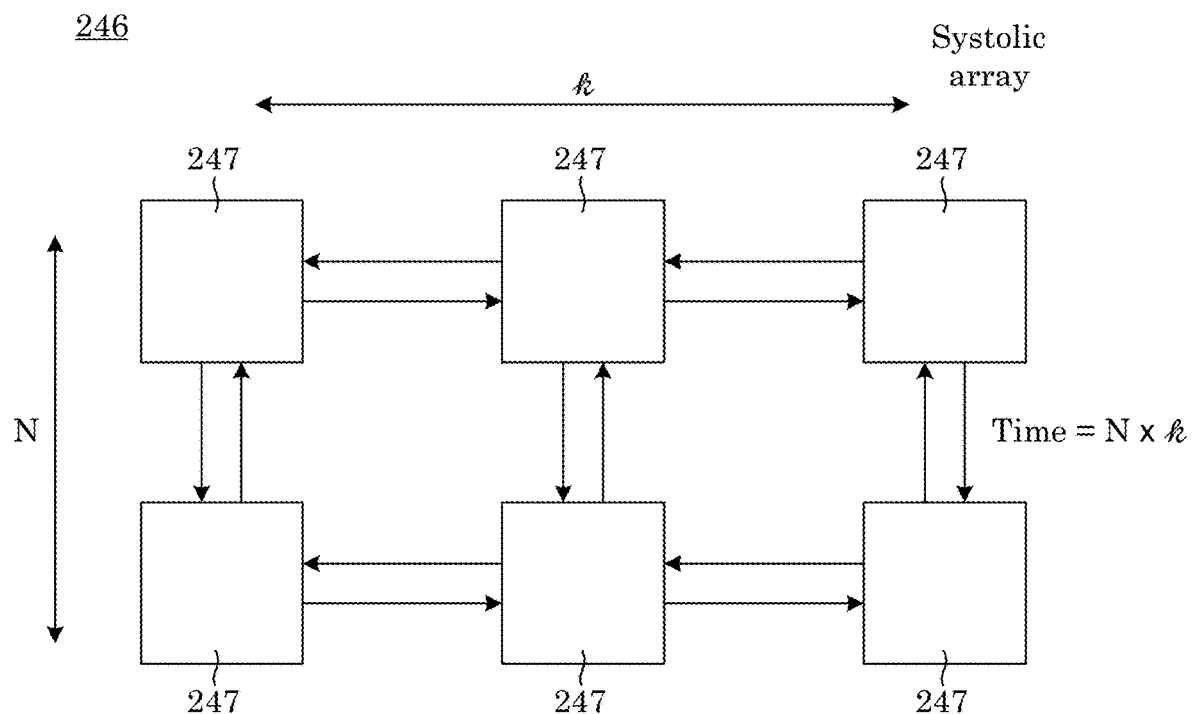
FIG. 12 shows a quasi-systolic array.

With reference to FIG. 12, systolic array 246 includes a plurality of systolic processors arranged in a N rows and k columns in which adjacent systolic processors are in direct data communication and communicate data in forward propagation and data in backward propagation. In the systolic array, propagation of information across n rows and m columns reduces dimensionality of input data from N to N–m·n. Each processing element reduces dimensionality by one, and dimensionality reduction scales linearly with an amount of time a datum takes to pass through the array. An array twice as large reduces dimensionality by twice as much, but takes twice as long to do so. By comparison, a quasi-systolic array reduces dimensionality by a factor of two. This multiplicative scaling provides dimensionality reduction that scales exponentially with the number of quasi-systolic elements. Although the area and energy required can be the same as the systolic array, the architectural arrangement of the quasi-systolic array provides the time required to perform dimensionality reduction that is exponentially accelerated.

The quasi-systolic array 200 achieves this reduction by arranging systolic elements in a binary tree structure and embedding the binary tree structure in a grid format. The exponential acceleration provided by this organizational structure can provide computations based on highly non-simple group operations, where different branches of the binary tree can act on distinct subgroups of an input space. Matrix rotations are examples of such tasks.

Quasi-systolic arrays can be arranged in two dimensions and can be implemented spatially in three dimensions. Conventional systolic arrays can be a one-dimensional array with outputs that present a subproblem to be solved by a second one-dimensional array, which presents a subproblem to be solved by a third one-dimensional array, and so-on recursively, resulting in two-dimensional structures. Due to the arrangement of elements in quasi-systolic processor 201, they have a tree structure and are two-dimensional structures. Solving the subproblem they present with another quasi-systolic array 200 is performed by recursively stacking quasi-systolic processors 201 on top of the first, into a third dimension.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Optional or optionally means that the subsequently described event or circumstance can or cannot occur, and that the description includes instances where the event occurs and instances where it does not. As used herein, combination is inclusive of blends, mixtures, alloys, reaction products, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms a and an and the and similar referents in the context of describing the invention (especially in the context of the following claims) are to be construed to cover both the singular and the plural, unless otherwise indicated herein or clearly contradicted by context. Or means and/or.

It can further be noted that the terms first, second, primary, secondary, and the like herein do not denote any order, quantity, or importance, but rather are used to distinguish one element from another. The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A quasi-systolic processor comprising:
a plurality of forward input transmission line that individually receive a forward datum, and a number of forward input transmission line is s;
a plurality of forward output transmission line that individually receive a forward output, and a number of forward output transmission line is s;
a plurality of backward input transmission line that individually receive a backward datum, and a number of backward input transmission line is s;
a plurality of backward output transmission line that individually receive a backward output, and a number of backward output transmission line is s;
a plurality of primary processor with a number of primary processor being f, such that:

$$f = \left\lfloor \frac{s}{2} \right\rfloor;$$

each primary processor is connected to:
one pair of the forward input transmission line that comprises:
a first forward input transmission line from which the primary processor receives a first forward datum and produces a first forward output from the first forward datum; and
a second forward input transmission line from which the primary processor receives a second forward datum and produces a second forward output from the second forward datum;
one pair of the forward output transmission line that comprises:
a first forward output transmission line that receives the first forward output from the primary processor; and
a second forward output transmission line that receives the second forward output from the primary processor;
one pair of the backward input transmission line that comprises:
a first backward input transmission line from which the primary processor receives a first backward datum and produces a first backward output from the first backward datum; and
a second backward input transmission line from which the primary processor receives a second backward datum and produces a second backward output from the second backward datum; and
one pair of the backward output transmission line that comprises:

a first backward output transmission line that receives the first backward output from the primary processor; and a second backward output transmission line that receives the second backward output from the primary processor; and each primary processor comprises:

a forward linear transform processor in electrical, magnetic, mechanical, or photonic communication with the first forward input transmission line, the second forward input transmission line, the first forward output transmission line, the second forward output transmission line, and a phase angle memory and that:

receives the first forward datum from the first forward input transmission line, the second forward datum from the second forward input transmission line, and a phase angle from the phase angle memory; and linearly transforms the first forward datum and the second forward datum through a rotation about the phase angle to produce the first forward output and the second forward output that are independent combinations of the first forward datum and the second forward datum;

a backward linear transform processor in electrical, magnetic, mechanical, or photonic communication with the first backward input transmission line, the second backward input transmission line, the first backward output transmission line, the second backward output transmission line, and the phase angle memory and that:

receives the first backward datum from the first backward input transmission line, the second backward datum from the second backward input transmission line, and the phase angle from the phase angle memory; and linearly transforms the first backward datum and the second backward datum through a rotation about the phase angle to produce the first backward output and the second backward output that are independent combinations of the first backward datum and the second backward datum;

the phase angle memory in electrical, magnetic, mechanical, or photonic communication with the forward linear transform processor and the backward linear transform processor and that: stores the phase angle; communicates the phase angle to the forward linear transform processor and the backward linear transform processor; receives a counter signal from a counter; receives a scaled accumulated phase from a phase angle accumulation memory; and updates the phase angle with the scaled accumulated phase in response to receiving the counter signal from the counter; and the phase angle accumulation memory in electrical, magnetic, mechanical, or photonic communication with the counter and the forward linear transform processor and that: receives the counter signal from the counter, the first forward output from the forward linear transform processor, and an accumulation reset signal from an accumulator controller; and produces the accumulated phase by cumulatively summing the first forward output; and resetting the accumulated phase to the accumulation reset signal in response to receiving the counter signal; and when s is odd, an identity processor that is connected to:

one forward input transmission line from which the identity processor receives forward datum and produces an identity output as forward output from the forward datum;

one forward output transmission line that receives the forward output from the identity processor;

one backward input transmission line from which the identity processor receives backward datum and produces backward output from the backward datum; and one backward output transmission line that receives the backward output from the identity processor, wherein each forward input transmission line is connected to one of: a single primary processor or a single identity processor of the quasi-systolic processor;

each backward input transmission line is connected to one of: a single primary processor or a single identity processor of the quasi-systolic processor;

each forward output transmission line is connected to one of: a single primary processor or a single identity processor of the quasi-systolic processor; and each backward output transmission line is connected to one of: a single primary processor or a single identity processor of the quasi-systolic processor.

2. The quasi-systolic processor of claim 1, wherein the primary processor further comprises the accumulator controller in electrical, magnetic, mechanical, or photonic communication with the phase angle accumulation memory.

3. The quasi-systolic processor of claim 1, wherein the primary processor further comprises the counter in electrical, magnetic, mechanical, or photonic communication with the phase angle accumulation memory, the phase angle memory, and the backward linear transform processor and that:

receives the accumulated phase from the phase angle accumulation memory;

receives the second backward output from the backward linear transform processor; and produces the scaled accumulated phase by applying the second backward output to the accumulated phase.

4. The quasi-systolic processor of claim 1, wherein the identity processor comprises:

a first dummy input member in electrical, magnetic, mechanical, or photonic communication with a second forward linear transform processor and that communicates first dummy input data to the second forward linear transform processor; and the second forward linear transform processor in electrical, magnetic, mechanical, or photonic communication with the forward input transmission line, a second phase angle memory, the forward output transmission line, and a first dummy output member and that:

receives forward datum from the forward input transmission line, first dummy input data from the first dummy input member, and a zero phase angle from the second phase angle memory; and linearly transforms the forward datum and the first dummy input data through rotation about the zero phase angle to produce the identity output as forward output and first dummy output data, such that the forward output is identical to the forward datum.

5. The quasi-systolic processor of claim 4, wherein the identity processor further comprises:

a second dummy input member in electrical, magnetic, mechanical, or photonic communication with a second backward linear transform processor and that communicates second dummy input data to the second forward linear transform processor; and the second backward linear transform processor in electrical, magnetic, mechanical, or photonic communication with the backward input transmission line, the second phase angle memory, the backward output transmission line, and a second dummy output member and that:

receives backward datum from the backward input transmission line, the second dummy input data from the second dummy input member, and the zero phase angle from the second phase angle memory; and linearly transforms the backward datum and the second dummy input data through rotation about the zero phase angle to produce backward output and the second dummy output data, such that the backward output is identical to the backward datum.

6. A quasi-systolic array comprising:

a primary quasi-systolic processor;

an edge row bank in data communication with the primary quasi-systolic processor and comprising a plurality of edge quasi-systolic processors;

an edge column bank in data communication with the primary quasi-systolic processor and comprising a plurality of edge quasi-systolic processors;

an interior bank in data communication with the edge row bank and the edge column bank and comprising a plurality of interior quasi-systolic processors, wherein each primary quasi-systolic processor, edge quasi-systolic processor, and interior quasi-systolic processor independently comprise a quasi-systolic processor of claim 1; each quasi-systolic processor is in electrical, magnetic, mechanical, or photonic communication with another quasi-systolic processor; and the quasi-systolic processors are disposed and electrically connected in rows and columns of quasi-systolic processors, such that:

the primary quasi-systolic processor and the edge row bank are disposed in a first row of the quasi-systolic array;

the primary quasi-systolic processor and the edge column bank are disposed in a first column of the quasi-systolic array;

the primary quasi-systolic processor initially receives forward datum before any other quasi-systolic processor in the quasi-systolic array and initially produces forward output from the initially received forward datum before any other quasi-systolic processor in the primary quasi-systolic processor;

at least half of the forward output transmission lines of the primary quasi-systolic processor is connected to a single edge quasi-systolic processor of the edge row bank, and at least half of the forward output transmission lines of the primary quasi-systolic processor is connected to a single edge quasi-systolic processor of the edge column bank;

in the edge row bank, edge quasi-systolic processors are electrically connected to each other in seriatum, and a number of forward input transmission line halves sequentially from quasi-systolic processor to quasi-systolic processor;

in the edge column bank, edge quasi-systolic processor are electrically connected to each other in seriatum, and a number of forward input transmission line halves sequentially from quasi-systolic processor to quasi-systolic processor; and in the interior bank, an interior quasi-systolic processor receives forward datum and produces backward datum that is subjected to backward propagation through interior quasi-systolic processors in the interior bank and edge quasi-systolic processors in the edge row bank and the edge column bank and finally received by the primary quasi-systolic processor.

7. The quasi-systolic array of claim 6, wherein the primary processor further comprises the accumulator controller in electrical, magnetic, or photonic communication with the phase angle accumulation memory.

8. The quasi-systolic array of claim 6, wherein the primary processor further comprises the counter in electrical, magnetic, mechanical, or photonic communication with the phase angle accumulation memory, the phase angle memory, and the backward linear transform processor and that:

receives the accumulated phase from the phase angle accumulation memory;

receives the second backward output from the backward linear transform processor; and produces the scaled accumulated phase by applying the second backward output to the accumulated phase.

9. The quasi-systolic array of claim 6, wherein the identity processor comprises:

a first dummy input member in electrical, magnetic, mechanical, or photonic communication with a second forward linear transform processor and that communicates first dummy input data to the second forward linear transform processor; and the second forward linear transform processor in electrical, magnetic, mechanical, or photonic communication with the forward input transmission line, a second phase angle memory, the forward output transmission line, and a first dummy output member and that:

receives forward datum from the forward input transmission line, first dummy input data from the first dummy input member, and a zero phase angle from the second phase angle memory; and linearly transforms the forward datum and the first dummy input data through rotation about the zero phase angle to produce the identity output as forward output and first dummy output data, such that the forward output is identical to the forward datum.

10. The quasi-systolic array of claim 9, wherein the identity processor further comprises:

a second dummy input member in electrical, magnetic, mechanical, or photonic communication with a second backward linear transform processor and that communicates second dummy input data to the second forward linear transform processor; and the second backward linear transform processor in electrical, magnetic, mechanical, or photonic communication with the backward input transmission line, the second phase angle memory, the backward output transmission line, and a second dummy output member and that:

receives backward datum from the backward input transmission line, the second dummy input data from the second dummy input member, and the zero phase angle from the second phase angle memory; and linearly transforms the backward datum and the second dummy input data through rotation about the zero phase angle to produce backward output and the second dummy output data, such that the backward output is identical to the backward datum.

11. A process for performing streaming eigen-updates in a hardware neuromorphic network that comprises the quasi-systolic array of claim 6, the process comprising:
  receiving, by the primary quasi-systolic processor of the quasi-systolic array, a first forward datum and a second forward datum;
  producing, by the primary quasi-systolic processor from the first forward datum and the second forward datum, a first forward output and a second forward output;
  receiving the first forward output from the primary quasi-systolic processor by the edge row bank, and serially iteratively transforming and reducing a dimensionality of the first forward output by the edge quasi-systolic processors of the edge row bank to produce third forward data for the interior quasi-systolic processors in the interior bank;
  receiving the second forward output from the primary quasi-systolic processor by the edge column bank, and serially iteratively transforming and reducing a dimensionality of the second forward output by the edge quasi-systolic processors of the edge column bank to produce fourth forward data for the interior quasi-systolic processor in the interior bank;
  receiving the third forward data and the fourth forward data by the interior quasi-systolic processor in the interior bank and producing first backward data and second backward date from the third forward data and the fourth forward data and backward propagating the first backward data and the second backward data through the interior quasi-systolic processors in the interior bank by serially iteratively transforming the first backward data and the fourth backward data by the interior quasi-systolic processors to produce third backward data and fourth backward data;
  receiving the third backward data from the interior bank by the edge row bank, and serially iteratively transforming the third backward data by the edge quasi-systolic processors of the edge row bank to produce fifth backward data for the primary quasi-systolic processor;
  receiving the fourth backward data from the interior bank by the edge column bank, and serially iteratively transforming the fourth backward data by the edge quasi-systolic processors of the edge column bank to produce sixth backward data for the primary quasi-systolic processor; and
  receiving the fifth backward data from the edge row bank and the sixth backward data from the edge column bank by the primary quasi-systolic processor, and transforming the fifth backward data and the sixth backward data by the primary quasi-systolic processor to produce final backward data to perform streaming eigen-updates in the hardware neuromorphic network.

\* \* \* \* \*